United States Patent
Yobimoto et al.

(10) Patent No.: US 12,219,012 B2
(45) Date of Patent: Feb. 4, 2025

(54) DATA-COLLECTING APPARATUS

(71) Applicant: DAIKIN INDUSTRIES, LTD., Osaka (JP)

(72) Inventors: Fumikazu Yobimoto, Osaka (JP); Minoru Tomoda, Osaka (JP); Kousuke Wakamatsu, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 16 days.

(21) Appl. No.: 18/131,156

(22) Filed: Apr. 5, 2023

(65) Prior Publication Data
US 2023/0239355 A1 Jul. 27, 2023

Related U.S. Application Data

(63) Continuation of application No. PCT/JP2021/038890, filed on Oct. 21, 2021.

(30) Foreign Application Priority Data

Oct. 23, 2020 (JP) ................................. 2020-178005

(51) Int. Cl.
*H04L 67/12* (2022.01)
*H04L 43/0882* (2022.01)
*H04L 43/0894* (2022.01)

(52) U.S. Cl.
CPC .......... *H04L 67/12* (2013.01); *H04L 43/0882* (2013.01); *H04L 43/0894* (2013.01)

(58) Field of Classification Search
CPC .............................. H04L 67/12; H04L 43/0882
USPC ......................................................... 709/224
See application file for complete search history.

(56) References Cited

FOREIGN PATENT DOCUMENTS

| CN | 115601194 A | * | 1/2023 |
|---|---|---|---|
| JP | 2004310265 A | * | 11/2004 |
| JP | 6157523 B2 | | 7/2017 |
| JP | 2019-61627 A | | 4/2019 |
| JP | 2019061627 A | * | 4/2019 |

OTHER PUBLICATIONS

European Search Report of corresponding EP Application No. 21 882 892.9 dated Mar. 6, 2024.
International Search Report of corresponding PCT Application No. PCT/JP2021/038890 dated Dec. 14, 2021.
International Preliminary Report of corresponding PCT Application No. PCT/JP2021/038890 dated May 4, 2023.

* cited by examiner

*Primary Examiner* — Sibte H Bukhari
(74) *Attorney, Agent, or Firm* — Global IP Counselors, LLP

(57) ABSTRACT

A data-collecting apparatus collects, from at least one piece of facility equipment, operation data of the facility equipment. The data-collecting apparatus includes a communication unit connected to a network, and a data-collecting unit. The network connects a management apparatus that manages the facility equipment, and the facility equipment. The data-collecting unit collects, with the communication unit, the operation data from the facility equipment based on a second collection condition different from a first collection condition at a time when the management apparatus collects the operation data from the facility equipment.

15 Claims, 9 Drawing Sheets

DATA-COLLECTING APPARATUS

CROSS-REFERENCE TO RELATED APPLICATIONS

This is a continuation of International Application No. PCT/JP2021/038890 filed on Oct. 21, 2021, which claims priority to Japanese Patent Application No. 2020-178005, filed on Oct. 23, 2020. The entire disclosures of these applications are incorporated by reference herein.

BACKGROUND

Technical Field

The present disclosure relates to a data-collecting apparatus.

Background Art

As disclosed in Japanese Patent No. 6157523, there is a technique in which a management apparatus collects operation data from facility equipment to manage the facility equipment.

SUMMARY

A data-collecting apparatus of a first aspect collects, from at least one piece of facility equipment, operation data of the facility equipment. The data-collecting apparatus includes a communication unit and a data-collecting unit. The communication unit is connected to a network that connects a management apparatus that manages the facility equipment, and the facility equipment. The data-collecting unit collects, with the communication unit, the operation data from the facility equipment on the basis of a second collection condition, which is different from a first collection condition at a time when the management apparatus collects the operation data from the facility equipment.

DETAILED DESCRIPTION OF EMBODIMENT(S)

First Embodiment (1) Overall Configuration

Figure 1:
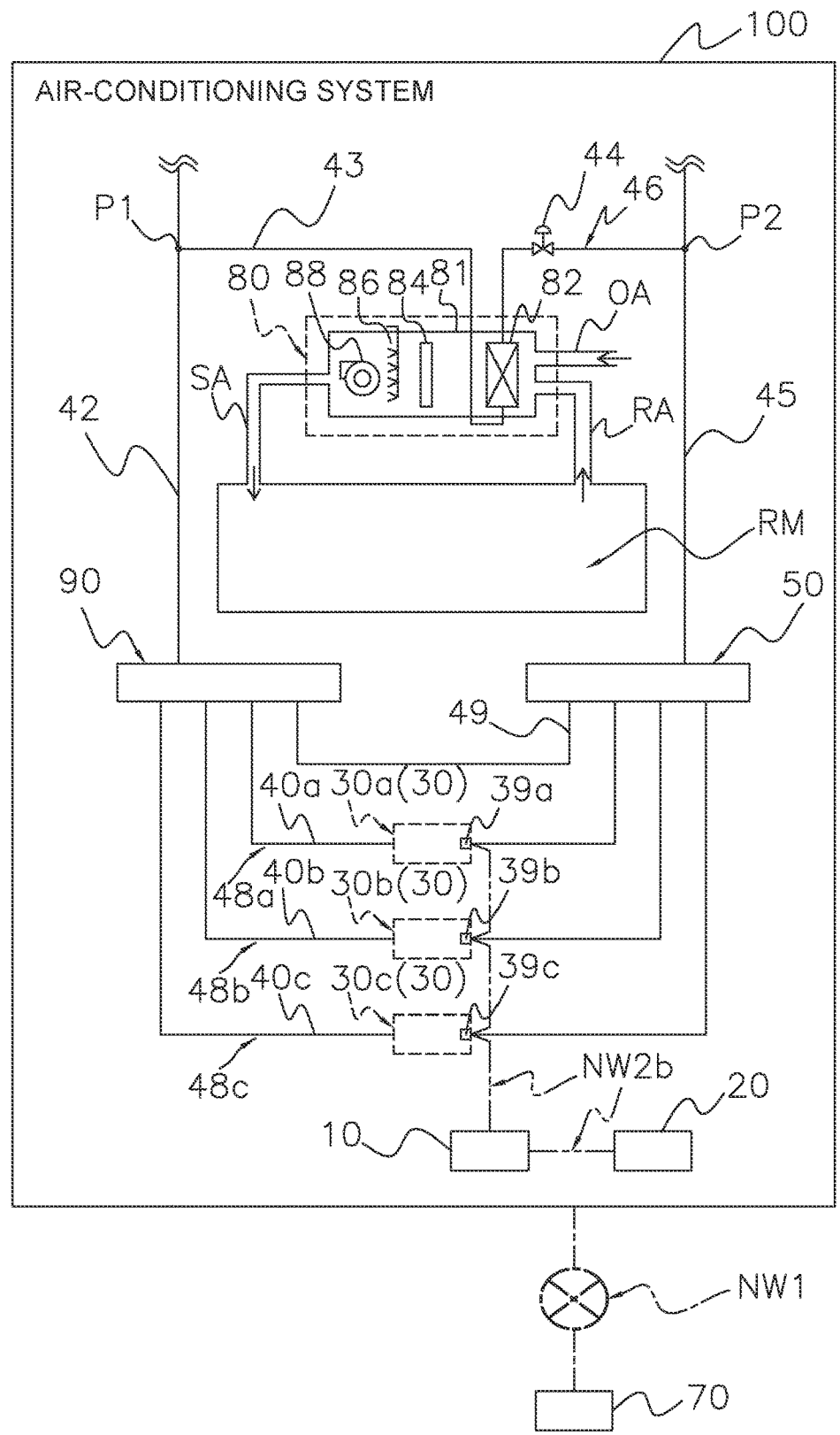
FIG. 1 is an overall configuration diagram of an air-conditioning system according to a first embodiment.

An air-conditioning system 100 conditions air of a target space RM in a building. FIG. 1 is an overall configuration diagram of the air-conditioning system 100 according to the present embodiment. As shown in FIG. 1, the air-conditioning system 100 mainly includes a data-collecting apparatus 10, a management apparatus 20, and facility equipment 30.

The facility equipment 30 is an air conditioner, such as an air conditioner or heat source equipment. The air-conditioning system 100 includes one piece of facility equipment 30 or a plurality of pieces of facility equipment 30 of a plurality of types. In the present embodiment, the facility equipment 30 is three chiller units 30a to 30c. The management apparatus 20 is an apparatus that manages the facility equipment 30. The air-conditioning system 100 includes one management apparatus 20 or a plurality of management apparatuses 20 of a plurality of types. In the present embodiment, the management apparatus 20 is an apparatus that manages the chiller units 30a to 30c. The data-collecting apparatus 10 is installed to relay communication between the management apparatus 20 and the facility equipment 30, and is an apparatus that mainly collects surplus data 23, which will be described later, from the facility equipment 30. In the present embodiment, the data-collecting apparatus 10 is installed to relay communication between the management apparatus 20 and the chiller units 30a to 30c, and collects surplus data 23 from the chiller units 30a to 30c.

Figure 2:
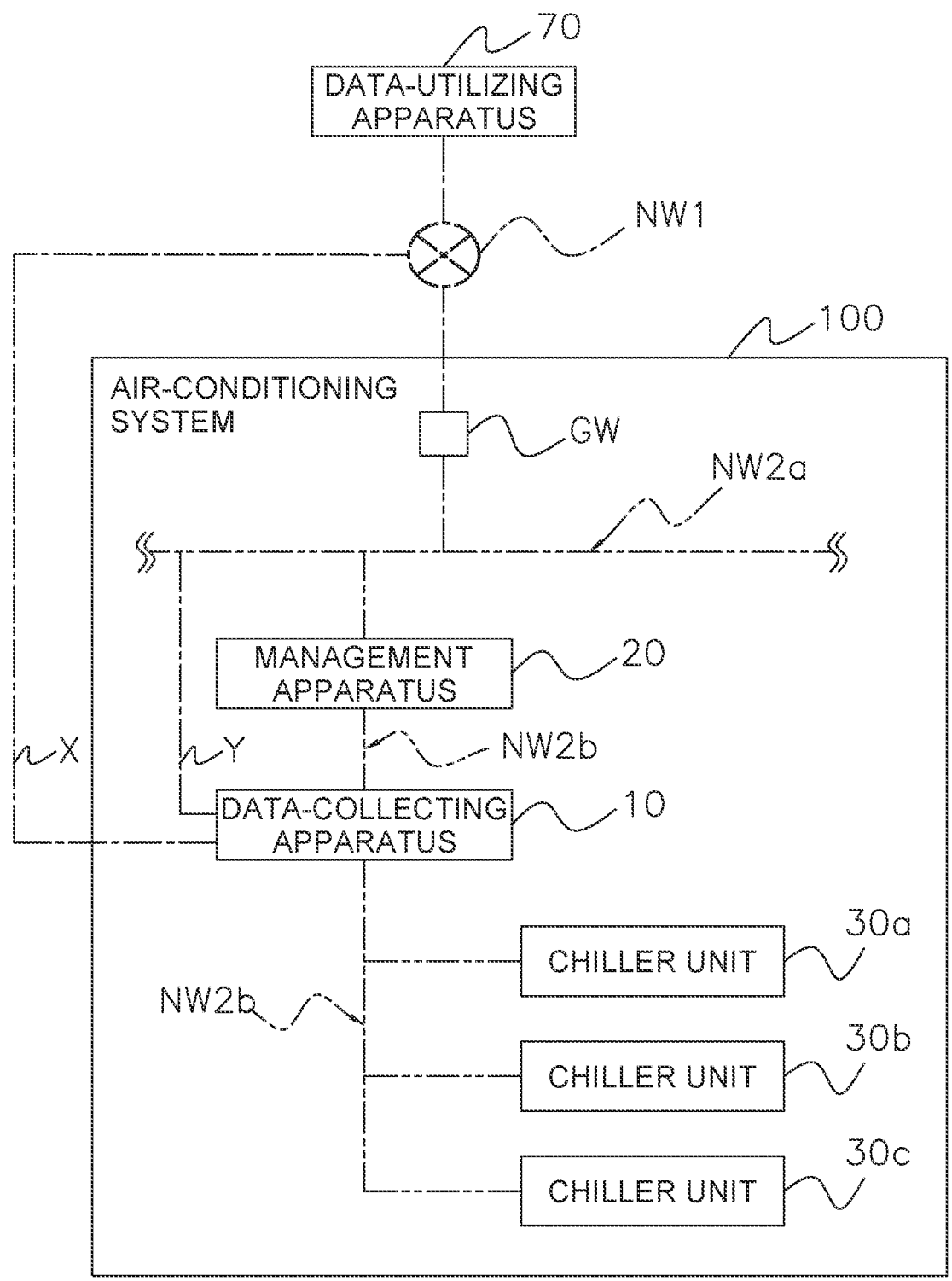
FIG. 2 is a diagram showing a communication network around a data-collecting apparatus according to the first embodiment.

FIG. 2 is a diagram showing a communication network around the data-collecting apparatus 10 according to the present embodiment. As shown in FIG. 2, the data-collecting apparatus 10, the management apparatus 20, and the chiller units 30a to 30c are communicably connected to each other through a network NW2b. Further, the management apparatus 20 is communicably connected to a data-utilizing apparatus 70 via a gateway GW through networks NW1 and NW2a. The network NW1 is, for example, the Internet. The networks NW2a and NW2b are, for example, Modbus, BACnet, Ethernet, and the like. The data-collecting apparatus 10 is communicably connected to the data-utilizing apparatus 70 by a communication line X and a communication line Y to be described later.

As shown in FIG. 1, the air-conditioning system 100 also includes air-conditioning units 80. FIG. 1 shows one of the plurality of air-conditioning units 80 as a representative. In the present embodiment, the air-conditioning unit 80 is assumed to be an air-handling unit. However, the air-conditioning unit 80 is not limited to an air-handling unit, and may be, for example, another air conditioner, such as a fan coil unit.

(2) Detailed Configuration
(2-1) Chiller Unit

Figure 3:
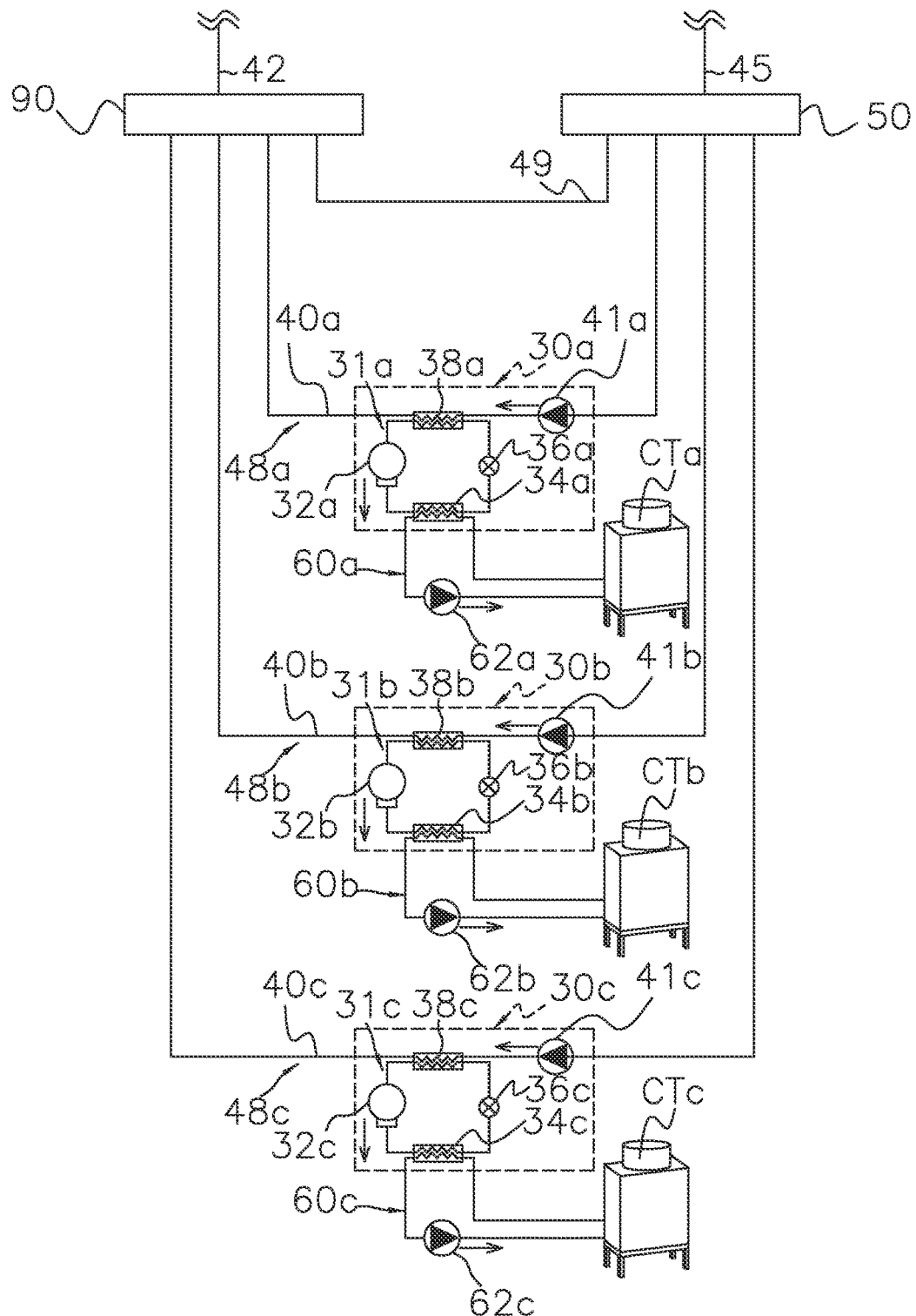
FIG. 3 is a diagram showing refrigerant circuits of chiller units according to the first embodiment.

FIG. 3 is a diagram showing refrigerant circuits of the chiller units 30a to 30c according to the present embodiment. As shown in FIGS. 1 and 3, the chiller units 30a to 30c mainly include compressors 32a to 32c, radiators 34a to 34c, expansion valves 36a to 36c, evaporators 38a to 38c, primary pumps 41a to 41c, and control units 39a to 39c. The compressors 32a to 32c, the radiators 34a to 34c, the expansion valves 36a to 36c, and the evaporators 38a to 38c are connected to each other by first refrigerant circuits 31a to 31c. The first refrigerant circuits 31a to 31c are filled with a refrigerant, such as R32. The primary pumps 41a to 41c are installed in heat-source-side flow channels 40a to 40c. Water as a heat carrier flows through the heat-source-side circuits 48a to 48c.

The compressors 32a to 32c suck in low-pressure refrigerant, compress the refrigerant with a compression mechanism (not shown), and discharge the compressed refrigerant. The compressors 32a to 32c are, for example, rotary-type or scroll-type positive displacement compressors. The compression mechanisms of the compressors 32a to 32c are driven by compressor motors (not shown). The compressor motor is a motor whose number of revolutions can be controlled by an inverter. The numbers of revolutions of the compressor motors are controlled to control the capacities of the compressors 32a to 32c.

The radiators 34a to 34c include first heat transfer tubes connected to the first refrigerant circuits 31a to 31c, and second heat transfer tubes connected to water circuits 60a to 60c. The radiators 34a to 34c perform heat exchange between the refrigerant flowing through the first heat transfer tubes on the first-refrigerant-circuits-31a-to-31c side, and water flowing through the second heat transfer tubes on the water-circuits-60a-to-60c side. The radiators 34a to 34c are, for example, a fin-and-tube-type heat exchanger including the plurality of heat transfer tubes and fins.

The expansion valves 36a to 36c are mechanisms for adjusting pressures and flow rates of the refrigerant flowing through the first refrigerant circuits 31a to 31c. In the present embodiment, the expansion valves 36a to 36c are electronic expansion valves.

The evaporators 38a to 38c include first heat transfer tubes connected to the first refrigerant circuits 31a to 31c, and second heat transfer tubes connected to the heat-source-side flow channels 40a to 40c. The evaporators 38a to 38c perform heat exchange between the refrigerant flowing through the first heat transfer tubes on the first-refrigerant-circuits-31a-to-31c side, and the heat carrier flowing through the second heat transfer tubes on the heat-source-side-flow-channels-40a-to-40c side, respectively. The evaporators 38a to 38c are, for example, a fin-and-tube-type heat exchanger including the plurality of heat transfer tubes and fins.

The primary pumps 41a to 41c feed out the water of the heat-source-side flow channels 40a to 40c from the upstream side to the downstream side. Since the primary pumps 41a to 41c are inverter-driven pumps, the capacities can be regulated, and the leaving-water pressures (or discharge flow rates) can be adjusted.

The control units 39a to 39c receive control signals from the management apparatus 20, and control the operations of the chiller units 30a to 30c. The control units 39a to 39c include a control arithmetic device and a storage device. As the control arithmetic device, a processor, such as a central processing unit (CPU) or a graphics processing unit (GPU), can be used. The control arithmetic device reads programs stored in the storage device, and performs predetermined arithmetic processing according to the programs. In addition, according to the programs, the control arithmetic device can write an arithmetic result into the storage device, and can read information stored in the storage device. The control units 39a to 39c also include timers.

The control units 39a to 39c are electrically connected to each equipment in the chiller units 30a to 30c, such as the compressors 32a to 32c, and are electrically connected to each sensor (not shown), such as a temperature sensor, to exchange control signals and information. The control units 39a to 39c store, in the storage devices for a certain period, various kinds of data acquired from each equipment in the chiller units 30a to 30c and each sensor. In the present embodiment, the various kinds of data will be referred to as operation data 21.

As shown in FIG. 1, the control units 39a to 39c are communicably connected to the management apparatus 20 via the data-collecting apparatus 10 through the network NW2b. The control units 39a to 39c receive control signals from the management apparatus 20 through the network NW2b. The control units 39a to 39c also transmit, to the management apparatus 20, part of the operation data 21 necessary for the control of the chiller units 30a to 30c by the management apparatus 20. In the present embodiment, the part of the operation data 21 is referred to as control data 22. Further, in the present embodiment, the operation data 21 except the control data 22 is referred to as surplus data 23. In other words, the operation data 21 includes the control data 22 and the surplus data 23.

(2-2) Water Circuit

The water circuits 60a to 60c are filled with water as a heat carrier. As shown in FIG. 3, the water circuits 60a to 60c are connected to the radiators 34a to 34c, water pumps 62a to 62c, and cooling towers CTa to CTc. The water pumps 62a to 62c can adjust discharge flow rates, and circulate the water of the water circuits 60a to 60c. The cooling towers CTa to CTc cool the water circulating through the water circuits 60a to 60c. In FIG. 3, the arrows attached to the water pumps 62a to 62c indicate the direction in which the water flows.

(2-3) Heat-Source-Side Circuit

Water as a heat carrier flows through the heat-source-side circuits 48a to 48c. As shown in FIG. 3, the heat-source-side circuits 48a to 48c include the heat-source-side flow channels 40a to 40c, the primary pumps 41a to 41c provided in the middle of the heat-source-side flow channels 40a to 40c, and heat-transfer-tube portions of the evaporators 38a to 38c connected to the heat-source-side flow channels 40a to 40c. The evaporators 38a to 38c cool the water as a heat carrier circulating through the heat-source-side flow channels 40a to 40c. In FIG. 3, the arrows attached to the primary pumps 41a to 41c indicate the direction in which the water flows.

(2-4) Return Header Portion

As shown in FIG. 1, water that has passed through a usage-side circuit 46 described below is fed to the heat-source-side circuits 48a to 48c via a return header portion 50. The upstream sides of the heat-source-side circuits 48a to 48c are connected to the downstream side of the return header portion 50. The downstream side of a usage-downstream-side merging-tube 45, which will be described later, is connected to the upstream side of the return header portion 50.

The return header portion 50 is provided with a flow rate sensor (not shown) for measuring the flow rate of water passing therethrough.

(2-5) Leaving-Header Portion

As shown in FIG. 1, the water that has passed through the heat-source-side circuits 48a to 48c is fed to the usage-side circuit 46 via a leaving-header portion 90. The downstream sides of the heat-source-side circuits 48a to 48c are connected to the upstream side of the leaving-header portion 90. The upstream side of a usage-upstream-side merging-tube 42, which will be described later, is connected to the downstream side of the leaving-header portion 90.

The leaving-header portion 90 is provided with a secondary pump (not shown), and can feed water from the heatsource-side circuits 48a to 48c toward the usage-side circuit 46. The secondary pump is an inverter-driven pump, and the capacity can be regulated to adjust the discharge flow rate.

(2-6) Bypass Circuit

As shown in FIG. 1, a bypass circuit 49 extends from the leaving-header portion 90 to the return header portion 50, and does not merge with the heat-source-side circuits 48a to 48c and the usage-side circuit 46.

The bypass circuit 49 is provided to return water excessively fed to the leaving-header portion 90, to the return header portion 50.

(2-7) Usage-Side Circuit

As shown in FIG. 1, the usage-upstream-side merging-tube 42 extending from the leaving-header portion 90 toward the downstream side branches, at a branching point P1, into the usage-side circuit 46 and a tube connected to another usage-side circuit (not shown). Further, the usage-side circuit 46 and the tube connected to another usage-side circuit (not shown) merge at a merging point P2. The usage-downstream-side merging-tube 45 extends from the merging point P2, and a downstream-side end portion of the usage-downstream-side merging-tube 45 is connected to the return header portion 50.

Water as a heat carrier flows through the usage-side circuit 46. The usage-side circuit 46 includes a usage-side flow channel 43, a flow-rate-adjusting valve 44 provided in the middle of the usage-side flow channel 43, and an air-cooling heat exchanger 82 connected to the usage-side flow channel 43. The flow-rate-adjusting valve 44 controls the valve opening degree to adjust the flow rate of the water flowing through the usage-side flow channel 43.

(2-8) Air-Conditioning Unit

As shown in FIG. 1, the air-conditioning unit 80 includes a casing 81 having a substantially rectangular-parallelepiped shape. An air passage through which air circulates is formed inside the casing 81. One end of a ventilation duct RA is connected to an inflow end of the air passage of the casing 81. The other end of the ventilation duct RA is connected to the target space RM. One end of an outdoor-air duct OA is also connected to the inflow end of the air passage. The other end of the outdoor-air duct OA is connected to the outdoor. One end of an air supply duct SA is connected to an outflow end of the air passage. The other end of the air supply duct SA is connected to the target space RM. Air in the target space RM and outdoor air are taken into the casing 81 through the ventilation duct RA and the outdoor-air duct OA, respectively. The temperature and humidity of the taken-into air are regulated in the casing 81. The air whose temperature and humidity have been regulated is fed to the target space RM through the air supply duct SA. In this way, the air in the target space RM is conditioned.

In the air passage in the casing 81, the air-cooling heat exchanger 82, an electric heater 84, a water spray humidifier 86, and a fan 88 are installed in this order from the upstream side to the downstream side. The air-cooling heat exchanger 82 is equipment that cools air to lower the temperature of the air, or dehumidifies air to lower the humidity. The air-cooling heat exchanger 82 is a fin-and-tube-type heat exchanger including a plurality of heat transfer fins, and a heat transfer tube penetrating the heat transfer fins. The electric heater 84 heats the air that has passed through the air-cooling heat exchanger 82. The electric heater 84 can adjust the heating amount of the air. The water spray humidifier 86 humidifies air flowing in the casing 81 by spraying, into the air from a nozzle, water in a tank (not shown) installed outside the casing 81. The water spray humidifier 86 can adjust the humidification amount of the air. The fan 88 generates a flow of the air to be blown into the target space RM through the air-cooling heat exchanger 82, the electric heater 84, and the water spray humidifier 86. The fan 88 can change the number of revolutions in a stepwise manner by inverter control to adjust the blowing amount.

(2-9) Management Apparatus

The management apparatus 20 manages the chiller units 30a to 30c (facility equipment 30). The management referred to here includes control. The management apparatus 20 includes a control arithmetic device and a storage device. As the control arithmetic device, a processor, such as a CPU or a GPU, can be used. The control arithmetic device reads programs stored in the storage device, and performs predetermined arithmetic processing according to the programs. In addition, according to the programs, the control arithmetic device can write an arithmetic result into the storage device, and can read information stored in the storage device. The management apparatus 20 also includes a timer.

The management apparatus 20 is configured to be capable of receiving various signals transmitted from a remote controller (not shown) for operating the chiller units 30a to 30c. The various signals transmitted from the remote controller include signals instructing operation and stop of the chiller units 30a to 30c, and signals related to various settings. The signals related to various settings include, for example, a switching signal of the operation mode, and a signal related to a set temperature and set humidity.

As shown in FIG. 2, the management apparatus 20 is communicably connected to the chiller units 30a to 30c via the data-collecting apparatus 10 through the network NW2b. The management apparatus 20 receives control data 22 from the control units 39a to 39c of the chiller units 30a to 30c. On the basis of the control data 22 received from the chiller units 30a to 30c, or various signals transmitted from the remote controller, the management apparatus 20 transmits control signals to the chiller units 30a to 30c.

Further, the management apparatus 20 is communicably connected to the data-utilizing apparatus 70 via the gateway GW through the networks NW1 and NW2a. The management apparatus 20 transmits, to the data-utilizing apparatus 70, the control data 22 received from the chiller units 30a to 30c.

(2-10) Data-Collecting Apparatus

Figure 4A:
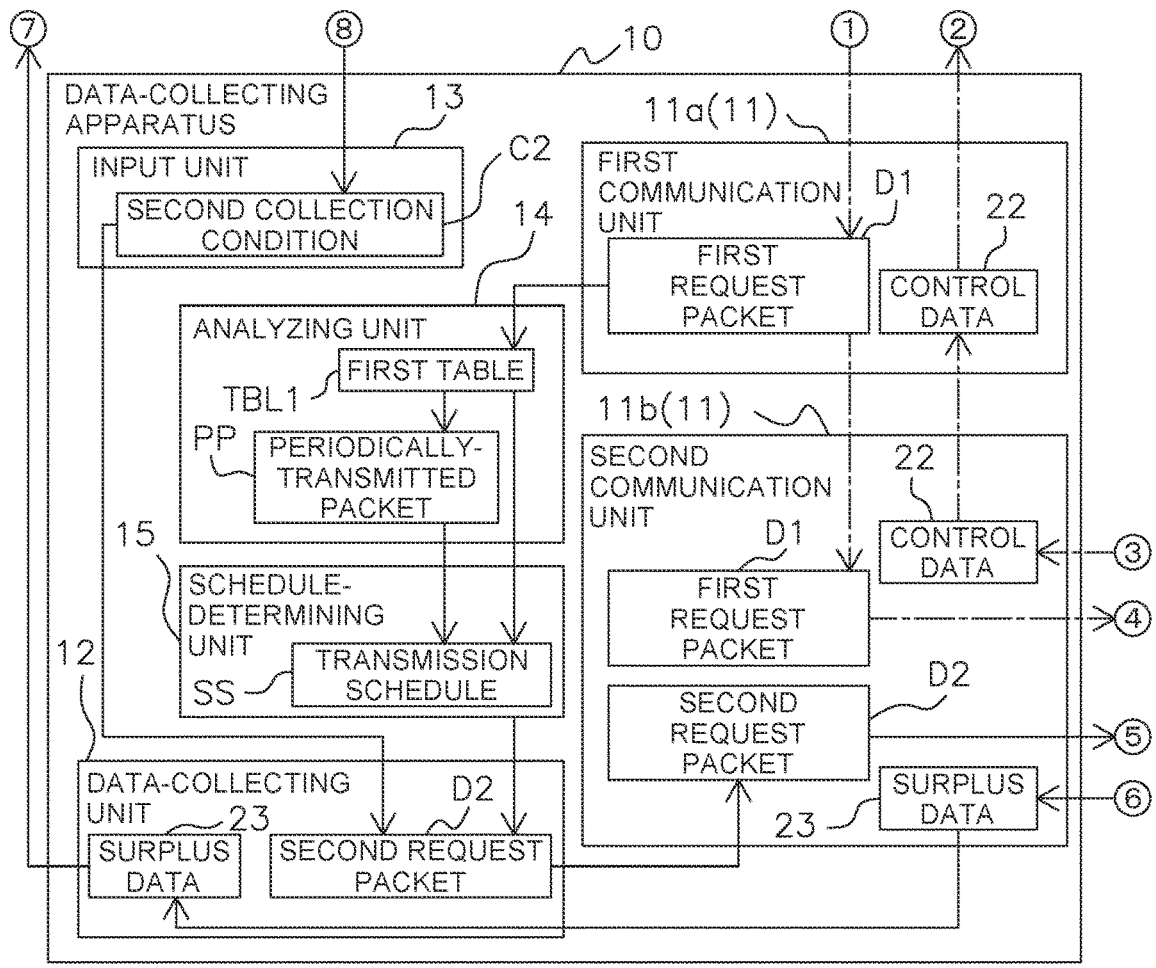
FIG. 4A is a functional block diagram of the data-collecting apparatus according to the first embodiment.
Figure 4B:
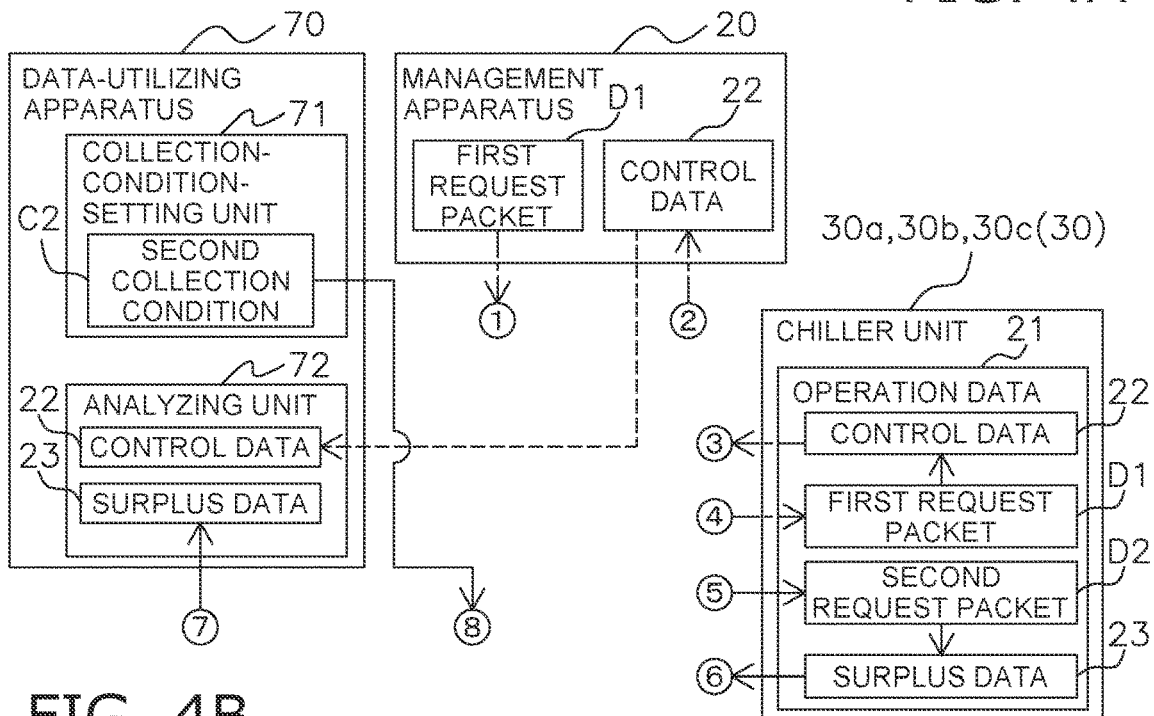
FIG. 4B is a functional block diagram of the data-collecting apparatus according to the first embodiment.

The data-collecting apparatus 10 collects, from the at least one chiller units 30a to 30c (facility equipment 30), surplus data 23 (operation data 21) of the chiller units 30a to 30c (facility equipment 30). FIGS. 4A and 4B are functional block diagrams of the data-collecting apparatus 10 according to the present embodiment. FIGS. 4A and 4B are connected by circled numbers. In FIGS. 4A and 4B, the three chiller units 30a to 30c are collectively shown. As shown in FIGS. 4A and 4B, the data-collecting apparatus 10 mainly includes a communication unit 11 and a data-collecting unit 12.

The data-collecting apparatus 10 includes a control arithmetic device and a storage device. As the control arithmetic device, a processor, such as a CPU or a GPU, can be used. The control arithmetic device reads programs stored in the storage device, and performs predetermined image processing and arithmetic processing according to the programs. In addition, according to the programs, the control arithmetic device can write an arithmetic result into the storage device, and can read information stored in the storage device. The data-collecting apparatus 10 also includes a timer. The communication unit 11, the data-collecting unit 12, an input unit 13 to be described later, an analyzing unit 14 to be described later, and a transmission-schedule-determining unit 15 to be described later are various functional blocks implemented by the control arithmetic device and the storage device.

(2-10-1) Communication Unit

The communication unit 11 connects the data-collecting apparatus 10 to the network NW2b that connects the management apparatus 20 and the chiller units 30a to 30c (facility equipment 30). As shown in FIGS. 4A and 4B, the communication unit 11 includes a first communication unit 11a that communicates with the management apparatus 20, and a second communication unit 11b that communicates with the chiller units 30a to 30c (facility equipment 30). The first communication unit 11a and the second communication unit 11b cooperate with each other to relay communication between the management apparatus 20 and the chiller units 30a to 30c (facility equipment 30).

Hereinafter, the relay processing will be specifically described. As indicated by dashed-dotted-line arrows in FIGS. 4A and 4B, when the first communication unit 11a receives a first request packet D1 from the management apparatus 20, the first communication unit 11a passes the first request packet D1 to the second communication unit 11b. The first request packet D1 is a packet with which the management apparatus 20 requests control data 22 from the chiller units 30a to 30c. The details will be described later. Here, it is assumed that the transmission destination of the first request packet D1 is the chiller unit 30a. When the second communication unit 11b receives the first request packet D1 from the first communication unit 11a, the second communication unit 11b transmits the first request packet D1 to the chiller unit 30a.

When the second communication unit 11b receives, from the chiller unit 30a, control data 22 requested with the first request packet D1, the second communication unit 11b passes the control data 22 to the first communication unit 11a. When the first communication unit 11a receives the control data 22 from the second communication unit 11b, the first communication unit 11a transmits the control data 22 to the management apparatus 20.

In this way, the first communication unit 11a and the second communication unit 11b cooperate with each other to relay communication between the management apparatus 20 and the chiller units 30a to 30c.

(2-10-2) Data-Collecting Unit

As shown in FIGS. 4A and 4B, the data-collecting unit 12 collects, with the second communication unit 11b (communication unit 11), surplus data 23 (operation data 21) from the chiller units 30a to 30c (facility equipment 30) on the basis of a second collection condition C2, which is different from a first collection condition at a time when the management apparatus 20 collects control data 22 (operation data 21) from the chiller units 30a to 30c (facility equipment 30). In the present embodiment, the first collection condition is a condition under which the management apparatus 20 collects part or all of control data 22 from the chiller units 30a to 30c. In other words, the first collection condition is a condition under which part or all of control data 22 is extracted. Further, the second collection condition C2 is a condition under which the data-collecting unit 12 collects part or all of surplus data 23 from the chiller units 30a to 30c. In other words, the second collection condition C2 is a condition under which part or all of surplus data 23 is extracted.

The data-collecting unit 12 transmits second request packets D2, which will be described later, to the chiller units 30a to 30c to collect surplus data 23 that satisfies the second collection condition C2. As shown in FIGS. 4A and 4B, the data-collecting unit 12 transmits the second request packets D2 according to a transmission schedule SS to be described later. Further, the data-collecting unit 12 acquires the second collection condition C2 from the input unit 13.

As shown in FIGS. 4A and 4B, the data-collecting unit 12 transmits the surplus data 23 (operation data 21) collected on the basis of the second collection condition C2, to the data-utilizing apparatus 70, which is an apparatus that is different from the management apparatus 20 and utilizes operation data 21. The data-collecting unit 12 sequentially or periodically transmits surplus data 23 that satisfies the second collection condition C2, to the data-utilizing apparatus 70. For example, as shown in FIG. 2, the data-collecting unit 12 transmits surplus data 23 to the data-utilizing apparatus 70 through the communication line X and the network NW1. The communication line X is a communication line for connecting the data-collecting apparatus 10 to the network NW1. Alternatively, for example, as shown in FIG. 2, the data-collecting unit 12 transmits surplus data 23 to the data-utilizing apparatus 70 through the communication line Y and the networks NW1 and NW2a. The communication line Y is a communication line for connecting the data-collecting apparatus 10 to the network NW2a.

(2-10-3) Input Unit

The input unit 13 inputs the second collection condition C2. As shown in FIGS. 4A and 4B, the input unit 13 receives at least input from the data-utilizing apparatus 70. For example, the input unit 13 may directly receive input from the user.

(2-10-4) Analyzing Unit

As shown in FIGS. 4A and 4B, the analyzing unit 14 analyzes the regularity of first request packets D1. The first request packet D1 is a communication packet that is for requesting control data 22 (operation data 21) and is transmitted to the chiller units 30a to 30c (facility equipment 30) when the management apparatus 20 collects the control data 22 (operation data 21) on the basis of the first collection condition.

On the basis of the first request packet information included in first request packets D1, the analyzing unit 14 determines, from the first request packets D1, a periodically-transmitted packet PP. The first request packet information includes information on the chiller units 30a to 30c (facility equipment 30), which are the transmission destinations of the first request packet D1, and the request content of the first request packet D1. The periodically-transmitted packet PP is a first request packet D1 periodically transmitted.

Hereinafter, a method for determining, from first request packets D1, a periodically-transmitted packet PP will be described.

As shown in FIGS. 4A and 4B, the analyzing unit 14 creates a first table TBL1 in which first request packet information, and the receipt times of the first request packets D1 are accumulated. Every time the first communication unit 11a receives a first request packet D1, the analyzing unit 14 acquires, from the first communication unit 11a, the first request packet information and receipt time of the first request packet D1, and updates the first table TBL1.

The analyzing unit 14 periodically scans the first table TBL1 (hereinafter, the scanning may be referred to as the periodic scanning) to check the state of the first table TBL1. In the present embodiment, the periodic scanning is performed once per minute. The timing of the periodic scanning can be appropriately changed, and may be, for example, once every 30 seconds. Further, the analyzing unit 14 periodically deletes all records of the first table TBL1 to reset the first table TBL1 (hereinafter, the reset may be referred to as the periodic reset). In the present embodiment, the periodic reset is performed once per hour. The timing of the periodic reset can be appropriately changed, and may be, for example, once every 30 minutes.

Further, the analyzing unit 14 starts to determine a periodically-transmitted packet PP at a predetermined timing. In the present embodiment, after a periodic reset is performed, at the timing of third periodic scanning, the analyzing unit 14 starts to determine a periodically-transmitted packet PP.

In other words, the analyzing unit 14 redetermines a periodically-transmitted packet PP every time a periodic reset is performed. The purpose is for dealing with a change in the regularity of periodically-transmitted packets PP in the middle. Here, the predetermined timing at which a periodically-transmitted packet PP is determined can be appropriately changed.

Table 1 below is an example of the first table TBL1 at a time when first periodic scanning has been performed after a periodic reset is performed.

TABLE 1

| Record ID | Facility equipment | Request content | Receipt time | Receipt time (before update) | Counter |
|---|---|---|---|---|---|
| 1 | 30a | 0x01 | 2019/8/26 18:12:44 | — | 1 |
| 2 | 30b | 0x02 | 2019/8/26 18:12:46 | — | 1 |
| 3 | 30a | 0x03 | 2019/8/26 18:12:47 | — | 1 |
| 4 | 30b | 0x04 | 2019/8/26 18:12:49 | — | 1 |

The first table TBL1 in which the "facility equipment" and the "request content" are primary keys is created. Here, the "facility equipment" is information for identifying the chiller units 30a to 30c, which are the transmission destinations of the first request packet D1. In Table 1, "30a" indicates the chiller unit 30a, and "30b" indicates the chiller unit 30b. The "request content" is information indicating the request content of the first request packet D1. Shown in Table 1 are the request contents encoded with hexadecimal numbers, such as "0x01". The "receipt time" is a time at which the first communication unit 11a receives the first request packet D1. In a case where first request packets D1 whose "facility equipment" and "request content" are the same have been received, the analyzing unit 14 updates the "receipt time" of the corresponding record to the most recent time. Every time the "receipt time" is updated, the "receipt time" before the update is stored in the "receipt time (before update)". Since in Table 1, first request packets D1 whose "facility equipment" and "request content" are the same have not yet been received, "-" is stored in the "receipt time (before update)". The "counter" is the number of times of receipt of first request packets D1 whose "facility equipment" and "request content" are the same. In other words, among first request packets D1 transmitted within a predetermined period, the analyzing unit 14 totals the number of the first request packets D1 whose "facility equipment" and "request content" (part of the first request packet information) are the same. The "record ID" is an identification number assigned to each record in which the "facility equipment" and the "request content" are the same. The "record ID" is provided to facilitate the following description.

Table 2 below is an example of the first table TBL1 at a time when second periodic scanning has been performed.

TABLE 2

| Record ID | Facility equipment | Request content | Receipt time | Receipt time (before update) | Counter |
|---|---|---|---|---|---|
| 1 | 30a | 0x01 | 2019/8/26 18:13:44 | 2019/8/26 18:12:44 | 2 |
| 2 | 30b | 0x02 | 2019/8/26 18:13:46 | 2019/8/26 18:12:46 | 2 |
| 3 | 30a | 0x03 | 2019/8/26 18:13:47 | 2019/8/26 18:12:47 | 2 |
| 4 | 30b | 0x04 | 2019/8/26 18:13:49 | 2019/8/26 18:12:49 | 2 |
| 5 | 30a | 0x05 | 2019/8/26 18:13:45 | — | 1 |

In Table 2, as compared with Table 1, the "receipt time" and the "counter" of the records of the "record ID"=1, 2, 3, and 4 are updated. The reason is that after the state of Table 1, first request packets D1 corresponding to the "record ID"=1, 2, 3, and 4 (first request packets D1 whose "facility equipment" and "request content" are the same) have been received. A record whose "record ID"=5 is a record newly added to the first table TBL1. It is seen that the first request packet D1 corresponding to the "record ID"=5 has been received after the first request packet D1 corresponding to the "record ID"=1 has been received and before the first request packet D1 corresponding to the "record ID"=2 has been received.

Table 3 below is an example of the first table TBL1 at a time when third periodic scanning has been performed. In the present embodiment, at this timing, the determination of a periodically-transmitted packet PP is started.

TABLE 3

| Record ID | Facility equipment | Request content | Receipt time | Receipt time (before update) | Counter |
|---|---|---|---|---|---|
| 1 | 30a | 0x01 | 2019/8/26 18:14:44 | 2019/8/26 18:13:44 | 3 |
| 2 | 30b | 0x02 | 2019/8/26 18:14:46 | 2019/8/26 18:13:46 | 3 |
| 3 | 30a | 0x03 | 2019/8/26 18:14:47 | 2019/8/26 18:13:47 | 3 |
| 4 | 30b | 0x04 | 2019/8/26 18:13:49 | 2019/8/26 18:12:49 | 2 |

TABLE 3-continued

| Record ID | Facility equipment | Request content | Receipt time | Receipt time (before update) | Counter |
|---|---|---|---|---|---|
| 5 | 30a | 0x05 | 2019/8/26 18:13:45 | — | 1 |
| 6 | 30b | 0x03 | 2019/8/26 18:15:00 | — | 1 |

In Table 3, as compared with Table 2, the records of the "record ID"=1, 2, and 3 are updated. Further, a record of the "record ID"=6 is newly added.

The analyzing unit 14 determines that a first request packet D1 having at least the largest value of the "counter" (totaled value) is a periodically-transmitted packet PP. Therefore, the analyzing unit 14 determines that the records of the "record ID"=1, 2, and 3 having the largest value of the "counter" are periodically-transmitted packets PP. Further, the analyzing unit 14 stores the largest value of the "counter", and stores records that have not been determined as the periodically-transmitted packets PP (that hereinafter may be referred to as pending records). In this case, the largest value to be stored is three. Further, the pending records to be stored are records whose "record ID"=4, 5, and 6.

Table 4 below is an example of the first table TBL1 at a time when fourth periodic scanning has been performed.

TABLE 4

| Record ID | Facility equipment | Request content | Receipt time | Receipt time (before update) | Counter |
|---|---|---|---|---|---|
| 1 | 30a | 0x01 | 2019/8/26 18:14:44 | 2019/8/26 18:13:44 | 3 |
| 2 | 30b | 0x02 | 2019/8/26 18:14:46 | 2019/8/26 18:13:46 | 3 |
| 3 | 30a | 0x03 | 2019/8/26 18:14:47 | 2019/8/26 18:13:47 | 3 |
| 4 | 30b | 0x04 | 2019/8/26 18:15:49 | 2019/8/26 18:13:49 | 3 |
| 5 | 30a | 0x05 | 2019/8/26 18:13:45 | — | 1 |
| 6 | 30b | 0x03 | 2019/8/26 18:15:00 | — | 1 |

In Table 4, as compared with Table 3, the record of the "record ID"=4 is updated.

The analyzing unit 14 subtracts the most recent values of the "counter" of the stored pending records (not in Table 3 but in Table 4), from the largest value that has been also stored. The analyzing unit 14 further determines that the pending record whose subtraction result is smaller than a predetermined value is a periodically-transmitted packet PP. In the present embodiment, the predetermined value is two. The predetermined value can be appropriately changed.

In Table 4, the record whose "record ID"=4 has the subtraction result of 0 (=3−3), which is smaller than the predetermined value (=2). Therefore, the analyzing unit 14 further determines that the record whose "record ID"=4 is a periodically-transmitted packet PP. The records whose "record ID"=5 and 6 have the subtraction result of 2 (=3-1), which is not smaller than the predetermined value (=2). Therefore, the analyzing unit 14 does not determine that the records whose "record ID"=5 and 6 are periodically-transmitted packets PP.

As described above, the analyzing unit 14 determines that the records whose "record ID"=1, 2, 3, and 4 are periodically-transmitted packets PP.

Note that the analyzing unit 14 may not use the predetermined value, and may determine that a stored pending record whose most recent value of the "counter" (not in Table 3 but in Table 4) becomes equal to or larger than the largest value that has been also stored is a periodically-transmitted packet PP.

(2-10-5) Transmission-Schedule-Determining Unit

The transmission-schedule-determining unit 15 determines a transmission schedule SS of second request packets D2. The second request packets D2 are communication packets that are for requesting surplus data 23 (operation data 21) and are transmitted to the chiller units 30a to 30c (facility equipment 30) when the data-collecting unit 12 collects the surplus data 23 (operation data 21) on the basis of the second collection condition C2. The second request packets D2 exist for the chiller units 30a to 30c, respectively.

The transmission-schedule-determining unit 15 determines a transmission schedule SS to transmit second request packets D2 in such a manner that the timings at which first request packets D1 are transmitted are avoided. In the present embodiment, as shown in FIGS. 4A and 4B, the transmission-schedule-determining unit 15 determines a transmission schedule SS to transmit second request packets D2 in such a manner that the timings at which periodically-transmitted packets PP are transmitted are avoided.

In the present embodiment, the transmission-schedule-determining unit 15 shares, with the analyzing unit 14, the results of the periodic scanning. When the analyzing unit 14 determines periodically-transmitted packets PP, the transmission-schedule-determining unit 15 calculates, on the basis of the receipt times of the periodically-transmitted packets PP received by the first communication unit 11a (communication unit 11), a receipt time period of consecutive ones of the periodically-transmitted packets PP and an interval time period during which the periodically-transmitted packets PP are not transmitted, to determine a transmission schedule SS of second request packets D2. Specifically, when the analyzing unit 14 determines periodically-transmitted packets PP, the transmission-schedule-determining unit 15 monitors a timing at which the records of the periodically-transmitted packets PP are further updated from the state of the first table TBL1 of Table 4. Here, it is assumed that the records of the periodically-transmitted packets PP are updated in fifth periodic scanning. Table 5 below is an example of the first table TBL1 at a time when the fifth periodic scanning has been performed.

TABLE 5

| Record ID | Facility equipment | Request content | Receipt time | Receipt time (before update) | Counter |
|---|---|---|---|---|---|
| 1 | 30a | 0x01 | 2019/8/26 18:16:49 | 2019/8/26 18:14:44 | 4 |
| 2 | 30b | 0x02 | 2019/8/26 18:14:46 | 2019/8/26 18:13:46 | 3 |
| 3 | 30a | 0x03 | 2019/8/26 18:14:47 | 2019/8/26 18:13:47 | 3 |
| 4 | 30b | 0x04 | 2019/8/26 18:15:49 | 2019/8/26 18:13:49 | 3 |
| 5 | 30a | 0x05 | 2019/8/26 18:13:45 | — | 1 |
| 6 | 30b | 0x03 | 2019/8/26 18:15:00 | — | 1 |

In Table 5, as compared with Table 4, the record of the "record ID"=1 is updated. It is seen from Table 5 that an interval time period during which the periodically-transmitted packets PP are not transmitted (time period from the "receipt time" of the record whose "record ID"=4 to the "receipt time" of the record whose "record ID"=1) is one minute. Further, it is seen from Table 5 that a receipt time period of consecutive ones of the periodically-transmitted packets PP (time period from the "receipt time (before update)" of the record whose "record ID"=1 to the "receipt time" of the record whose "record ID"=4) is one minute and five seconds.

A time period during which second request packets D2 are going to be transmitted is set to, for example, one minute from the receipt of the first request packet D1 whose "record ID"=4 (interval time period). For example, it is assumed that 16.25 seconds (=one minute and five seconds (receipt time period)/four packets (the number of periodically-transmitted packets PP)) are necessary for each second request packet D2. Therefore, the number of the second request packets D2 to be transmitted is set to three (=an integer part obtained by dividing one minute (interval time period) by 16.25 seconds (time period necessary for one of the second request packets D2)). Since in the present embodiment, there are the three chiller units 30a to 30c, for example, one second request packet D2 is transmitted to each chiller unit during the interval time period.

As described above, the transmission-schedule-determining unit 15 determines the transmission schedule SS such that a total of the three second request packets D2 are going to be transmitted to the chiller units 30a to 30c within one minute of the receipt of the first request packet D1 corresponding to the "record ID"=4.

As shown in FIGS. 4A and 4B, according to the transmission schedule SS, the data-collecting unit 12 transmits second request packets D2 to the chiller units 30a to 30c. The data-collecting unit 12 acquires, from the first communication unit 11a or the analyzing unit 14, the timing of the receipt of the first request packet D1 corresponding to the "record ID"=4.

(2-11) Data-Utilizing Apparatus

The data-utilizing apparatus 70 is an apparatus that utilizes operation data 21. As shown in FIG. 2, the data-utilizing apparatus 70 is communicably connected to the data-collecting apparatus 10 and the management apparatus 20 through the networks NW1 and NW2a. As shown in FIGS. 4A and 4B, the data-utilizing apparatus 70 mainly includes a collection-condition-setting unit 71 and an analyzing unit 72.

The data-utilizing apparatus 70 includes a control arithmetic device and a storage device. As the control arithmetic device, a processor, such as a CPU or a GPU, can be used. The control arithmetic device reads programs stored in the storage device, and performs predetermined image processing and arithmetic processing according to the programs. In addition, according to the programs, the control arithmetic device can write an arithmetic result into the storage device, and can read information stored in the storage device. The data-utilizing apparatus 70 also includes a timer. The collection-condition-setting unit 71 and the analyzing unit 72 are various functional blocks implemented by the control arithmetic device and the storage device.

(2-11-1) Collection-Condition-Setting Unit

As shown in FIGS. 4A and 4B, the collection-condition-setting unit 71 receives the setting of the second collection condition C2, and transmits the set second collection condition C2 to the input unit 13. The second collection condition C2 is set by, for example, input by the user or reading of a file.

(2-11-2) Analyzing Unit

As shown in FIGS. 4A and 4B, the analyzing unit 72 receives control data 22 from the management apparatus 20. The analyzing unit 72 also receives surplus data 23 from the data-collecting unit 12.

The analyzing unit 72 analyzes the received control data 22 and surplus data 23, and utilizes the received control data 22 and surplus data 23 for remote monitoring, failure diagnosis, and the like of the chiller units 30a to 30c. For the analysis, for example, a statistical technique, machine learning, or the like are used.

(3) Data Collection Processing

Figure 5:
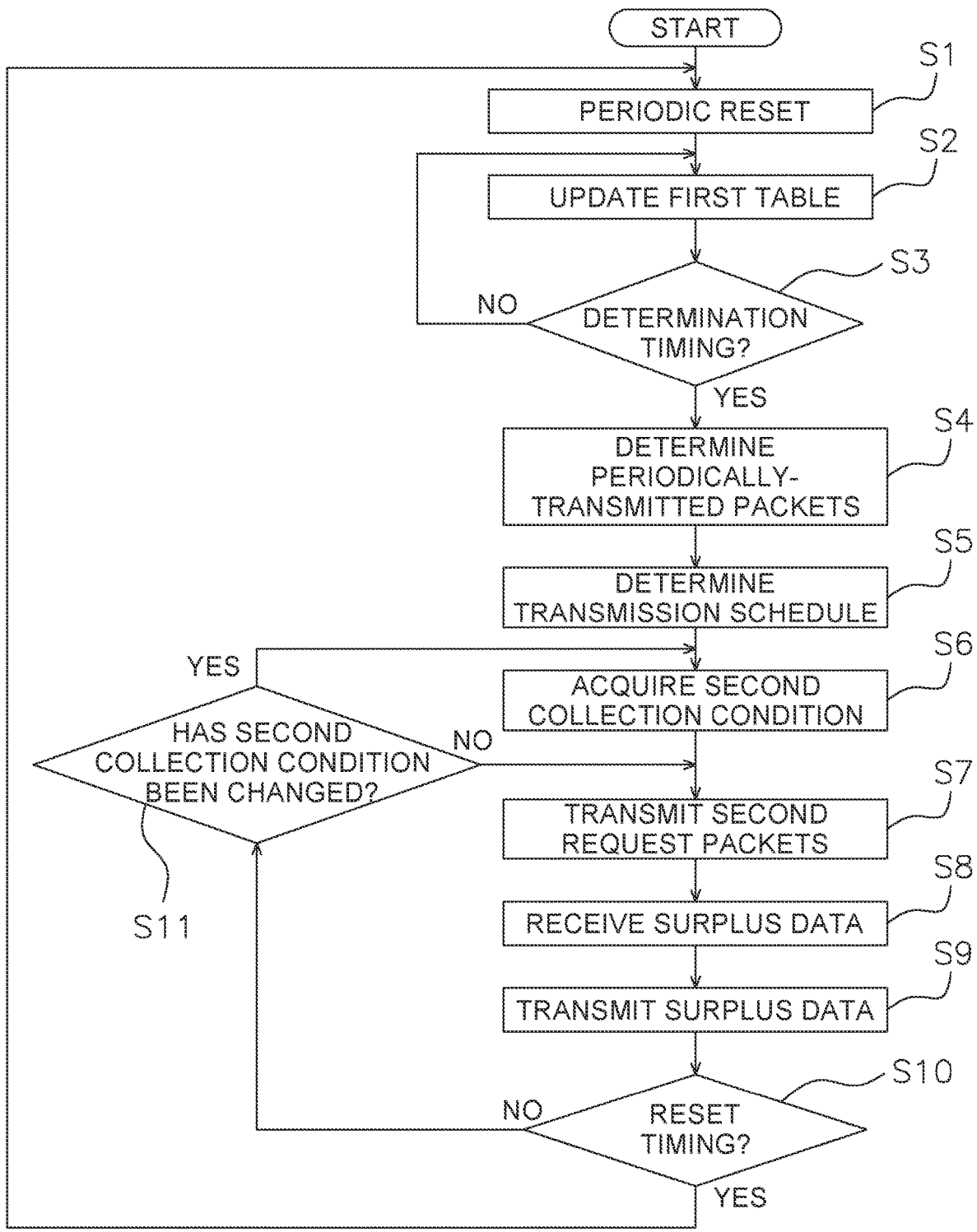
FIG. 5 is a flowchart of data collection processing according to the first embodiment.

An example of data collection processing performed by the data-collecting apparatus 10 will be described with reference to the flowchart of FIG. 5. Note that in FIGS. 4A and 4B, the data collection processing is indicated by solid-line arrows.

As shown in step S1, the data-collecting apparatus 10 performs a periodic reset of the first table TBL1.

After step S1 is ended, as shown in step S2, every time the data-collecting apparatus 10 receives a first request packet D1 from the management apparatus 20, the data-collecting apparatus 10 acquires the first request packet information of the first request packet D1 and updates the first table TBL1.

After step S2 is ended, as shown in step S3, the data-collecting apparatus 10 ascertains whether or not a timing for determining periodically-transmitted packets PP has come. In a case where a timing for determining periodically-transmitted packets PP has come, the data-collecting apparatus 10 proceeds to step S4. In a case where a timing for determining periodically-transmitted packets PP has not come, the data-collecting apparatus 10 returns to step S2 to continue to update the first table TBL1.

When the data-collecting apparatus 10 proceeds from step S3 to step S4, as shown in step S4, the data-collecting apparatus 10 determines, from first request packets D1 of the first table TBL1, periodically-transmitted packets PP.

When step S4 is ended, as shown in step S5, the data-collecting apparatus 10 determines a transmission schedule SS of second request packets D2 on the basis of the receipt times of the periodically-transmitted packets PP.

After step S5 is ended, as shown in step S6, the data-collecting apparatus 10 acquires a second collection condition C2 set by the data-utilizing apparatus 70.

When step S6 is ended, as shown in step S7, according to the transmission schedule SS, the data-collecting apparatus 10 transmits, to the chiller units 30a to 30c, second request packets D2 for requesting surplus data 23 that satisfies the second collection condition C2.

After step S7 is ended, as shown in step S8, the data-collecting apparatus 10 receives, from the chiller units 30a to 30c, surplus data 23 that has been requested with the second request packets D2 and satisfies the second collection condition C2.

After step S8 is ended, as shown in step S9, the data-collecting apparatus 10 transmits, to the data-utilizing apparatus 70, the surplus data 23 received from the chiller units 30a to 30c.

When step S9 is ended, as shown in step S10, the data-collecting apparatus 10 ascertains whether or not a timing for performing a periodic reset of the first table TBL1 has come. In a case where a timing for performing a periodic reset of the first table TBL1 has come, the data-collecting apparatus 10 returns to step S1 to perform the periodic reset of the first table TBL1. In a case where a timing for performing a periodic reset of the first table TBL1 has not come, the data-collecting apparatus 10 proceeds to step S11.

When the data-collecting apparatus 10 proceeds from step S10 to step S11, as shown in step S11, the data-collecting apparatus 10 ascertains whether or not the second collection condition C2 has been changed. In a case where the second collection condition C2 has been changed, the data-collecting apparatus 10 proceeds to step S11 to acquire the changed second collection condition C2. In a case where the second collection condition C2 has not been changed, the data-collecting apparatus 10 proceeds to step S7 to continue to transmit second request packets D2.

The data collection processing is executed until all the chiller units 30a to 30c are stopped.

(4) Features (4-1)

There has been a technique in which a management apparatus collects operation data from facility equipment to manage the facility equipment. However, since the management apparatus mainly collects data necessary for managing the facility equipment, the operation data collected by the management apparatus is part of the operation data of the facility equipment. Therefore, there is a problem that the useful operation data except the operation data collected by the management apparatus is not collected.

In the data-collecting apparatus 10 of the present embodiment, the communication unit 11 connects the data-collecting apparatus 10 to the network NW2b that connects the management apparatus 20 that manages the chiller units 30a to 30c, and the chiller units 30a to 30c. The data-collecting unit 12 collects, with the second communication unit 11b, surplus data 23 from the chiller units 30a to 30c on the basis of the second collection condition C2, which is different from the first collection condition at a time when the management apparatus 20 collects control data 22 from the chiller units 30a to 30c.

As a result, the data-collecting apparatus 10 can collect, from the chiller units 30a to 30c, the useful surplus data 23 except the control data 22 collected by the management apparatus 20 from the chiller units 30a to 30c.

(4-2)

In the data-collecting apparatus 10 of the present embodiment, the communication unit 11 includes the first communication unit 11a that communicates with the management apparatus 20, and the second communication unit 11b that communicates with the chiller units 30a to 30c. The first communication unit 11a and the second communication unit 11b cooperate with each other to relay the communication between the management apparatus 20 and the chiller units 30a to 30c.

As a result, the data-collecting apparatus 10 is installed to relay the communication between the management apparatus 20 and the chiller units 30a to 30c, and thus can collect operation data 21 on the basis of the second collection condition C2 without a change to an existing system.

(4-3)

In the data-collecting apparatus 10 of the present embodiment, the data-collecting unit 12 transmits surplus data 23 collected on the basis of the second collection condition C2, to the data-utilizing apparatus 70, which is an apparatus that is different from the management apparatus 20 and utilizes operation data 21.

As a result, the data-collecting apparatus 10 can utilize, for remote monitoring, failure diagnosis, and the like, the surplus data 23 collected on the basis of the second collection condition C2.

(4-4)

In the data-collecting apparatus 10 of the present embodiment, the input unit 13 inputs the second collection condition C2. The input unit 13 receives at least input from the data-utilizing apparatus 70.

As a result, the data-collecting apparatus 10 can input the second collection condition C2 corresponding to a purpose of utilization of surplus data 23.

(4-5)

In the data-collecting apparatus 10 of the present embodiment, the analyzing unit 14 analyzes the regularity of first request packets D1. The first request packet D1 is a communication packet that is for requesting control data 22 and is transmitted to the chiller units 30a to 30c when the management apparatus 20 collects the control data 22 on the basis of the first collection condition.

As a result, the data-collecting apparatus 10 analyzes the regularity of first request packets D1, so that the data-collecting apparatus 10 can collect surplus data 23 on the basis of the second collection condition C2 in such a manner that delays in responses to the first request packets D1 do not occur.

(4-6)

In the data-collecting apparatus 10 of the present embodiment, on the basis of the first request packet information included in first request packets D1, the analyzing unit 14 determines, from the first request packets D1, a periodically-transmitted packet PP. The first request packet information includes information on the chiller units 30a to 30c, which are the transmission destinations of the first request packet D1, and the request content of the first request packet D1. The periodically-transmitted packet PP is a first request packet D1 periodically transmitted.

As a result, the data-collecting apparatus 10 determines, from first request packets D1, a periodically-transmitted packet PP, so that the data-collecting apparatus 10 can collect surplus data 23 on the basis of the second collection condition C2 in such a manner that a delay in a response to the periodically-transmitted packet PP does not occur.

(4-7)

In the data-collecting apparatus 10 of the present embodiment, among first request packets D1 transmitted within a predetermined period, the analyzing unit 14 totals the number of the first request packets D1 whose part of the first request packet information is the same. The analyzing unit 14 determines that a first request packet D1 having at least the largest totaled value is a periodically-transmitted packet PP.

As a result, the data-collecting apparatus 10 determines, from first request packets D1, a periodically-transmitted packet PP, so that the data-collecting apparatus 10 can collect surplus data 23 on the basis of the second collection condition C2 in such a manner that a delay in a response to the periodically-transmitted packet PP does not occur.

(4-8)

In the data-collecting apparatus 10 of the present embodiment, the transmission-schedule-determining unit 15 determines a transmission schedule SS of second request packets D2. The second request packets D2 are communication packets that are for requesting surplus data 23 and are transmitted to the chiller units 30a to 30c when the data-collecting unit 12 collects the surplus data 23 on the basis of the second collection condition C2. The transmission-schedule-determining unit 15 determines a transmission schedule SS to transmit second request packets D2 in such a manner that the timings at which first request packets D1 are transmitted are avoided.

Specifically, the transmission-schedule-determining unit 15 calculates, on the basis of the receipt times of periodically-transmitted packets PP received by the first communication unit 11a, a receipt time period of consecutive ones of the periodically-transmitted packets PP and an interval time period during which the periodically-transmitted packets PP are not transmitted, to determine a transmission schedule SS of second request packets D2.

As a result, according to the transmission schedule SS, the data-collecting apparatus 10 transmits the second request packets D2, so that delays in responses to periodically-transmitted packets PP can be prevented.

(5) Modifications (5-1) Modification 1A

In the present embodiment, first request packet information includes information on the chiller units 30a to 30c, which are the transmission destinations of the first request packet D1, and the request content of the first request packet D1.

However, first request packet information may further include "IP address", "memory address", "number of registers", and the like of the chiller units 30a to 30. In this case, a first table TBL1 is created with "facility equipment", "request content", "IP address", "memory address", "number of registers", and the like as primary keys. In other words, the analyzing unit 14 ascertains first request packets D1 that have the same "facility equipment", "request content", "IP address", "memory address", "number of registers", and the like as the same first request packets D1.

As a result, the data-collecting apparatus 10 can determine, with the analyzing unit 14, periodically-transmitted packets PP in more detail. Further, the data-collecting apparatus 10 can determine, with the transmission-schedule-determining unit 15, a transmission schedule SS in more detail.

(5-2) Modification 1B

In the present embodiment, control data 22 that satisfies the first collection condition is transmitted from the management apparatus 20 to the data-utilizing apparatus 70.

However, control data 22 that satisfies the first collection condition may be transmitted from the data-collecting apparatus 10 to the data-utilizing apparatus 70.

In other words, on the basis of the first collection condition, the data-collecting unit 12 further collects, with the communication unit 11, control data 22 (operation data 21) from the chiller units 30a to 30c (facility equipment 30). The data-collecting unit 12 further transmits, to the data-utilizing apparatus 70, the control data 22 (operation data 21) collected on the basis of the first collection condition.

For example, the data-collecting unit 12 collects, from the first communication unit 11a or the second communication unit 11b, control data 22 that satisfies the first collection condition and has been received from the chiller units 30a to 30c by the first communication unit 11a or the second communication unit 11b, and transmits the control data 22 to the data-utilizing apparatus 70. The data-collecting unit 12 sequentially or periodically collects control data 22 that satisfies the first collection condition, and transmits the control data 22 to the data-utilizing apparatus 70.

As a result, the data-collecting apparatus 10 can utilize, for remote monitoring, failure diagnosis, and the like, control data 22 collected on the basis of the first collection condition. Further, the data-collecting apparatus 10 can remove a load of the management apparatus 20 transmitting control data 22 to the data-utilizing apparatus 70.

(5-3) Modification 1C

In the present embodiment, when the analyzing unit 14 determines periodically-transmitted packets PP, the transmission-schedule-determining unit 15 calculates, on the basis of the receipt times of the periodically-transmitted packets PP received by the first communication unit 11a, a receipt time period of consecutive ones of the periodically-transmitted packets PP and an interval time period during which the periodically-transmitted packets PP are not transmitted, to determine a transmission schedule SS of second request packets D2.

However, when the analyzing unit 14 determines periodically-transmitted packets PP, the transmission-schedule-determining unit 15 calculates, on the basis of the transmission times of the periodically-transmitted packets PP transmitted by the second communication unit 11b and the receipt times of control data 22 (operation data 21) received by the second communication unit 11b (communication unit 11) and transmitted from the chiller units 30a to 30c (facility equipment 30) in response to the periodically-transmitted packets PP, response time periods of the periodically-transmitted packets PP and an interval time period during which the periodically-transmitted packets PP are not transmitted, to determine a transmission schedule SS of second request packets D2.

As a result, according to the transmission schedule SS, the data-collecting apparatus 10 transmits the second request packets D2, so that delays in responses to periodically-transmitted packets PP can be prevented.

In this case, after a periodically-transmitted packet PP is received from the management apparatus 20, the analyzing unit 14 acquires, from the second communication unit 11b, a transmission time at which the periodically-transmitted packet PP is transmitted to the chiller units 30a to 30c and receipt times at which pieces of control data 22 corresponding to the periodically-transmitted packet PP are received (hereinafter, the receipt times may be referred to as the response times), and stores the transmission times and the receipt times in the first table TBL1.

Table 6 below is an example showing the above-described transmission time and response times with respect to four periodically-transmitted packets PP. In Table 6, as in Table 1 and the like, transmission times and response times before update are stored.

TABLE 6

| Record ID | Facility equipment | Request content | Transmission time | Transmission time (before update) | Response time | Response time (before update) |
|---|---|---|---|---|---|---|
| 1 | 30a | 0x01 | 2019/8/26 18:40:49 | 2019/8/26 18:14:44 | 2019/8/26 18:41:49 | 2019/8/26 18:15:44 |
| 2 | 30b | 0x02 | 2019/8/26 18:18:46 | — | 2019/8/26 18:20:46 | — |
| 3 | 30a | 0x03 | 2019/8/26 18:23:47 | — | 2019/8/26 18:24:47 | — |
| 4 | 30b | 0x04 | 2019/8/26 18:28:49 | — | 2019/8/26 18:30:49 | — |

It is seen from Table 6 that the response time periods of the periodically-transmitted packets PP (time periods from the transmission times to the response times of the same records) are one minute for the record whose "record ID"=1, two minutes for the record whose "record ID"=2, one minute for the record whose "record ID"=3, and two minutes for the record whose "record ID"=4. In other words, it is seen that the response time period of the chiller unit 30a is one minute, and the response time period of the chiller unit 30b is two minutes. Further, it is seen that the interval time periods during which the periodically-transmitted packets PP are not transmitted (time periods from the response times of certain records to the transmission times of the next transmitted records) are three minutes and two seconds between the "record IDs"=1 and 2, three minutes and one second between the "record IDs"=2 and 3, four minutes and two seconds between the "record IDs"=3 and 4, and ten minutes between the "record IDs"=4 and 1.

A time period during which second request packets D2 are transmitted is, for example, an interval time period during which the periodically-transmitted packets PP are not transmitted. The transmission destinations of second request packets D2 may be determined such that corresponding interval time periods are filled with the response time period of each of the chiller units 30a to 30c. For example, since the interval time period between the "record IDs"=1 and 2 is three minutes and two seconds, during the interval time period, one second request packet D2 is transmitted to each of the chiller unit 30a (the response time period is one minute) and the chiller unit 30b (the response time period is two minutes).

As described above, the transmission-schedule-determining unit 15 determines a transmission schedule SS such that second request packets D2 are transmitted to the appropriate chiller units 30a to 30c during an interval time period from a response time at which each control data 22 corresponding to a periodically-transmitted packet PP is received. Note that when the data-collecting unit 12 transmits second request packets D2 according to a transmission schedule SS, the data-collecting unit 12 acquires, from the second communication unit 11b or the analyzing unit 14, a response time at which each control data 22 corresponding to a periodically-transmitted packet PP is received.

(5-4) Modification 1D

The transmission-schedule-determining unit 15 may determine, on the basis of the priorities of second request packets D2, a transmission schedule SS of the second request packets D2. For example, the transmission-schedule-determining unit 15 determines a transmission schedule SS in such a manner that a second request packet D2 for requesting surplus data 23 related to a malfunction and having a high priority is preferentially transmitted.

As a result, the data-collecting apparatus 10 can preferentially collect surplus data 23 related to a malfunction or the like and having a high priority.

(5-5) Modification 1E

For example, the transmission-schedule-determining unit 15 may determine a transmission schedule SS on the basis of the bandwidth occupancy rate of the network NW2b that connects the management apparatus 20 and the chiller units 30a to 30c (facility equipment 30). For example, in a case where the bandwidth occupancy rate of the network NW2b exceeds a predetermined value, the transmission-schedule-determining unit 15 determines a transmission schedule SS in such a manner that transmission of second request packets D2 is stopped. Here, the bandwidth occupancy rate of the network NW2b is analyzed by the analyzing unit 14. The analysis of the bandwidth occupancy rate is performed by using, for example, existing network diagnosis software or the like.

As a result, the data-collecting apparatus 10 can prevent congestion of the network NW2b.

(5-6) Modification 1F

Figure 6:
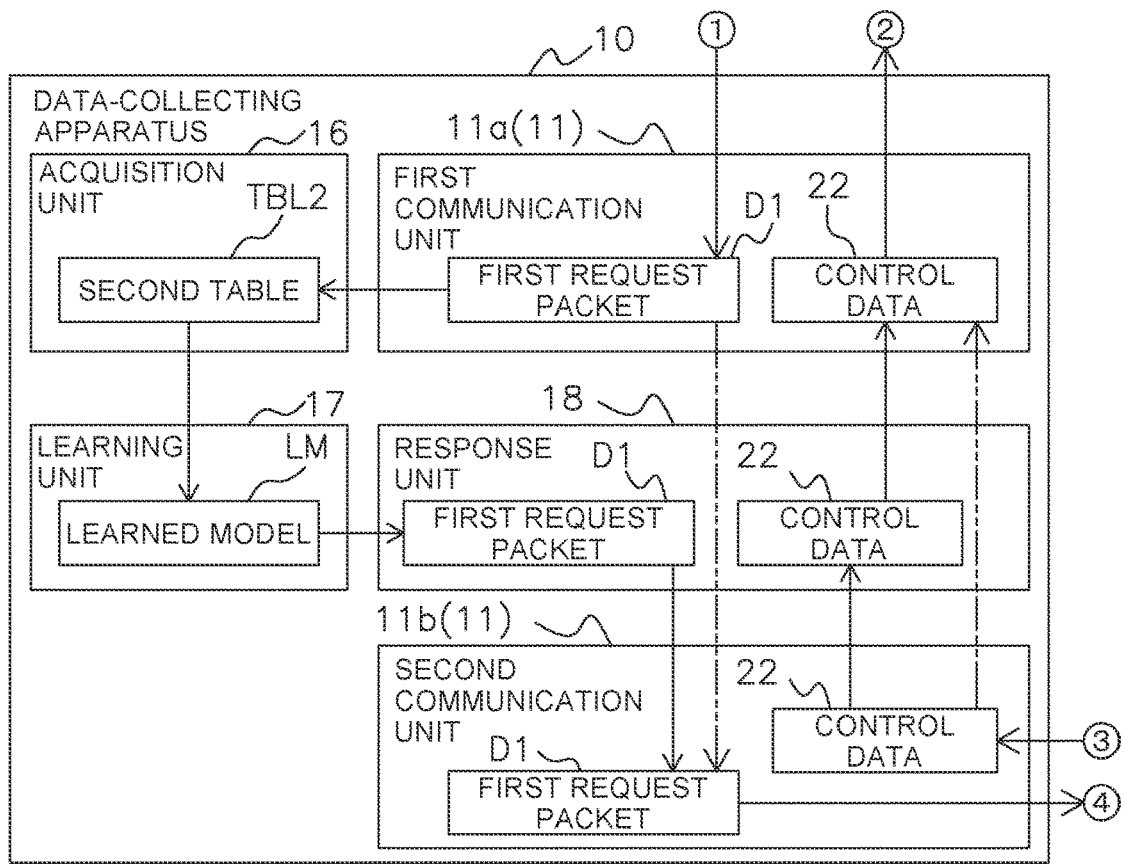
FIG. 6 is a functional block diagram of a data-collecting apparatus according to a modification 1F of the first embodiment.

The data-collecting apparatus 10 may further include an acquisition unit 16, a learning unit 17, and a response unit 18. FIG. 6 is a functional block diagram of the data-collecting apparatus 10 according to the present modification. In FIG. 6, portions except portions related to the present modification are omitted. Further, FIGS. 6 and 4B are connected by circled numbers. The acquisition unit 16, the learning unit 17, and the response unit 18 are various functional blocks implemented by the control arithmetic device and the storage device.

The acquisition unit 16 acquires the receipt time at which a first request packet D1 is received by the first communication unit 11a (communication unit 11), and the first request packet information of the first request packet D1. Specifically, as indicated by solid-line arrows in FIG. 6, the acquisition unit 16 creates a second table TBL2 in which the receipt times of first request packets D1, and the first request packet information of the first request packets D1 are accumulated. Every time the first communication unit 11a receives a first request packet D1, the acquisition unit 16 acquires, from the first communication unit 11a, the receipt time and first request packet information of the first request packet D1, and updates the second table TBL2.

Table 7 below is an example of the second table TBL2.

TABLE 7

| Receipt time | Facility equipment | Request content |
|---|---|---|
| 2019/8/26 18:12:44 | 30a | 0x01 |
| 2019/8/26 18:12:46 | 30b | 0x02 |
| 2019/8/26 18:12:47 | 30a | 0x03 |

TABLE 7-continued

| Receipt time | Facility equipment | Request content |
| --- | --- | --- |
| 2019/8/26 18:12:49 | 30b | 0x04 |
| 2019/8/26 18:13:44 | 30a | 0x01 |
| 2019/8/26 18:13:45 | 30a | 0x05 |
| 2019/8/26 18:13:46 | 30b | 0x02 |
| 2019/8/26 18:13:47 | 30a | 0x03 |
| 2019/8/26 18:13:49 | 30b | 0x04 |

As shown in Table 7, the difference between the second table TBL2 and the first table TBL1 is that when first request packets D1 whose "facility equipment" and "request content" are the same are received, the "receipt time" is not updated to the most recent time, but the first request packets D1 are simply accumulated.

As indicated by the solid-line arrows in FIG. 6, the learning unit 17 generates a learned model LM that learns by association the receipt times of first request packets D1 and the first request packet information of the first request packets D1 that have been acquired by the acquisition unit 16. The learning unit 17 uses the records accumulated in the second table TBL2 to generate the learned model LM. The learning unit 17 may update the learned model LM each time some records have been accumulated in the second table TBL2. Alternatively, the learning unit 17 may sequentially update the learned model LM each time one record is added to the second table TBL2. As the learned model LM, for example, a recurrent neural network, a state space model, or the like is used.

As a result, the data-collecting apparatus 10 can learn the relationships between the receipt times of the first request packets D1, and the transmission destinations, request contents, and the like of the first request packets D1 included in the first request packet information.

The response unit 18 responds to the first request packets D1. As indicated by the solid-line arrows in FIG. 6, before a predetermined time, the response unit 18 uses the learned model LM to predict the first request packet information of a first request packet D1 to be received at the predetermined time. On the basis of a first request packet D1 including the predicted first request packet information, the response unit 18 acquires, with the second communication unit 11b, control data 22 (operation data 21) from the chiller units 30a to 30c (facility equipment 30). The response unit 18 caches the control data 22. In a case where after the predetermined time, the first communication unit 11a receives a first request packet D1 including the predicted first request packet information, the response unit 18 does not relay the first request packet D1 to the chiller units 30a to 30c (facility equipment 30), but the response unit 18, instead of the chiller units 30a to 30c (facility equipment 30), transmits the cached control data 22 (operation data 21) to the management apparatus 20.

As a result, the data-collecting apparatus 10 can respond to the management apparatus 20 on behalf of the chiller units 30a to 30c, and thus a time period of the response to the management apparatus 20 can be shortened.

Note that in a case where when a first request packet D1 is received from the management apparatus 20, control data 22 requested by the first request packet D1 has not been cached, the data-collecting apparatus 10 performs relay processing similar to the relay processing of the present embodiment, as indicated by dashed-double-dotted-line arrows in FIG. 6.

(5-7) Modification 1G

Figure 7:
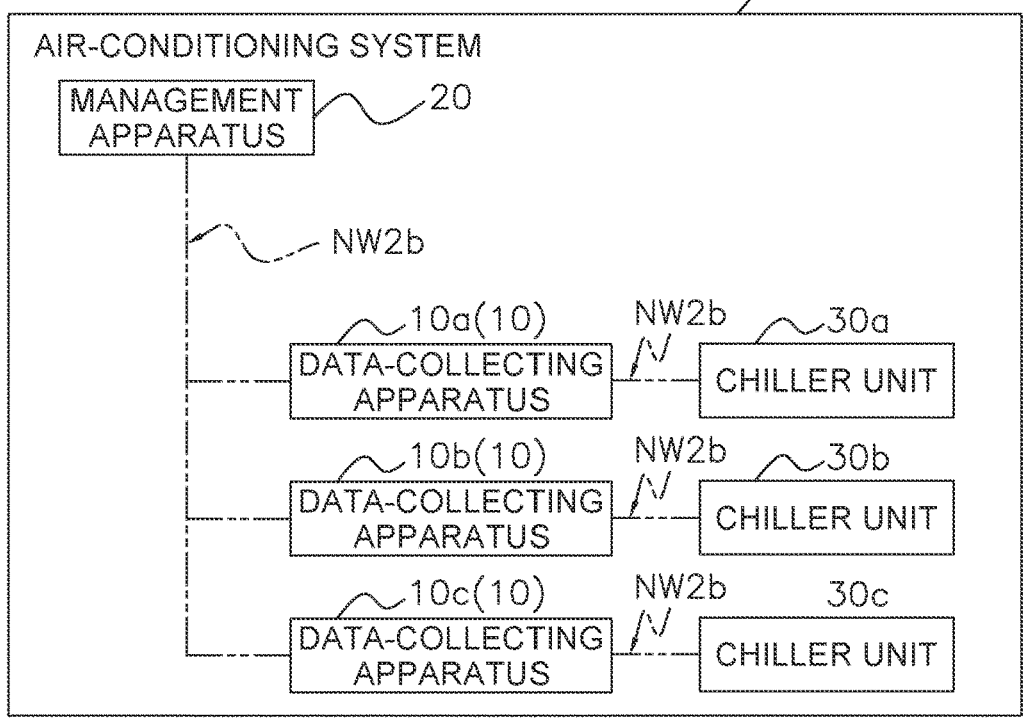
FIG. 7 is a diagram showing a communication network around a data-collecting apparatus according to a modification 1G of the first embodiment.

FIG. 7 is a diagram showing a communication network around data-collecting apparatuses 10a to 10c according to the present modification. In the present embodiment, as shown in FIG. 2, the one data-collecting apparatus 10 is installed for the three chiller units 30a to 30c. However, as shown in FIG. 7, the data-collecting apparatuses 10a to 10c may be installed for the chiller units 30a to 30c, respectively.

In this case, for example, the data-collecting apparatus 10a relays only first request packets D1 to the chiller unit 30a from the management apparatus 20. Further, the data-collecting apparatus 10a transmits second request packets D2 only to the chiller unit 30a. As a result, the processing loads of the data-collecting apparatuses 10a to 10c can be reduced. Further, the data-collecting apparatuses 10a to 10c can increase the number of pieces of surplus data 23 to be collected.

(5-8)

Although the embodiments of the present disclosure have been described above, it will be understood that various changes in the forms and details can be made without departing from the spirit and scope of the present disclosure as set forth in the claims.

Second Embodiment (1) Difference from First Embodiment

Figure 8:
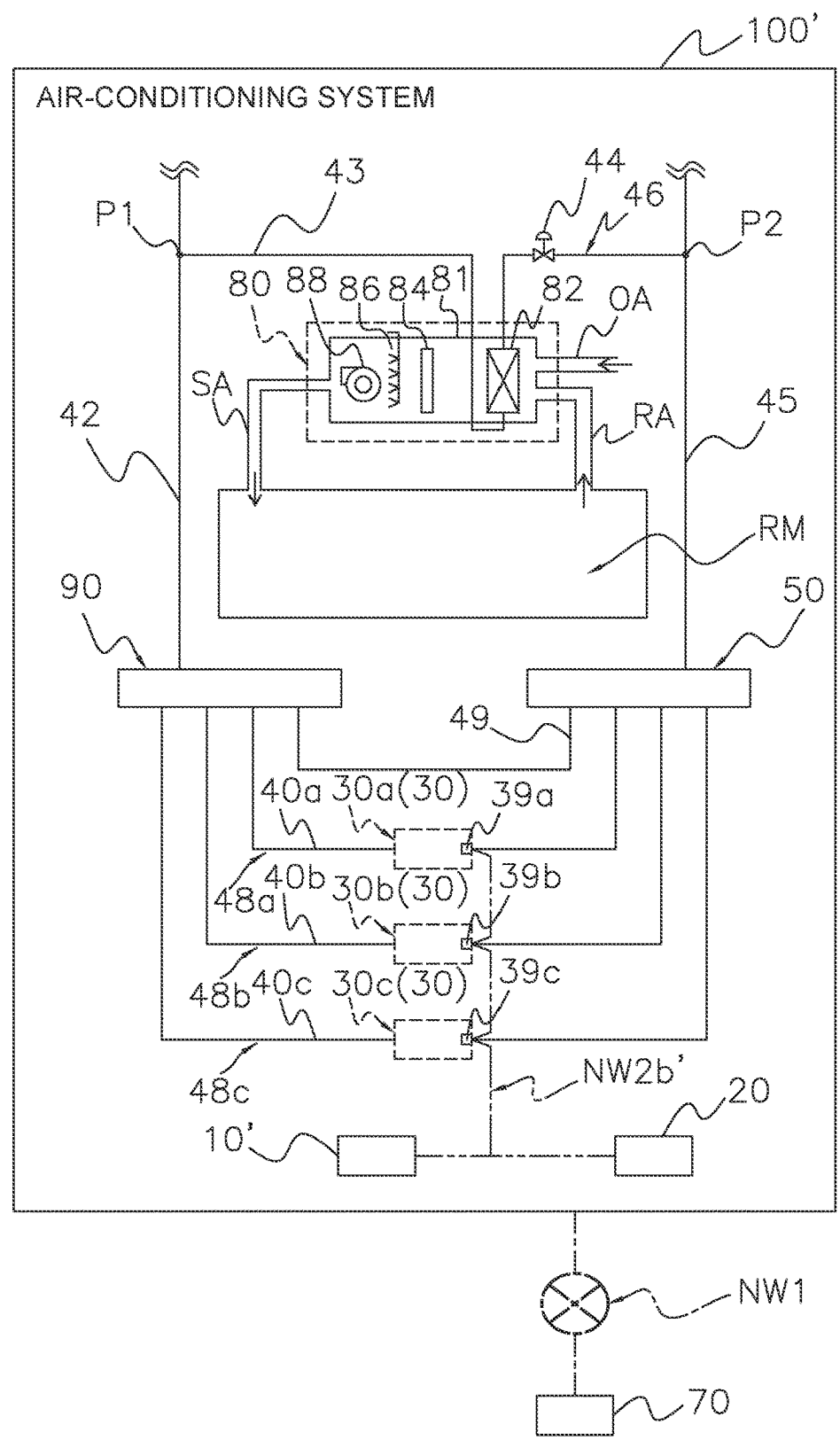
FIG. 8 is an overall configuration diagram of an air-conditioning system according to a second embodiment.
Figure 9:
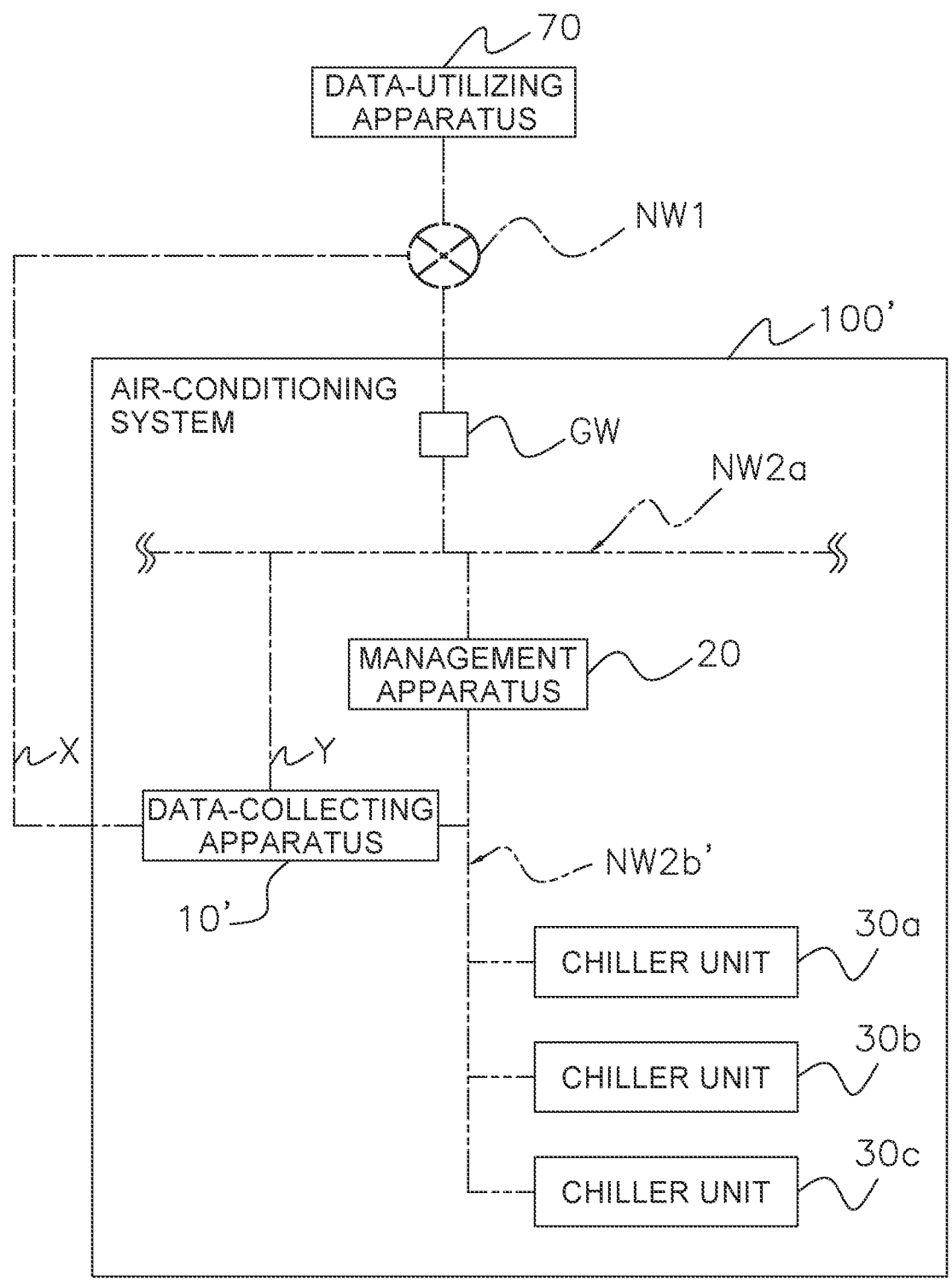
FIG. 9 is a diagram showing a communication network around a data-collecting apparatus according to the second embodiment.
Figure 10:
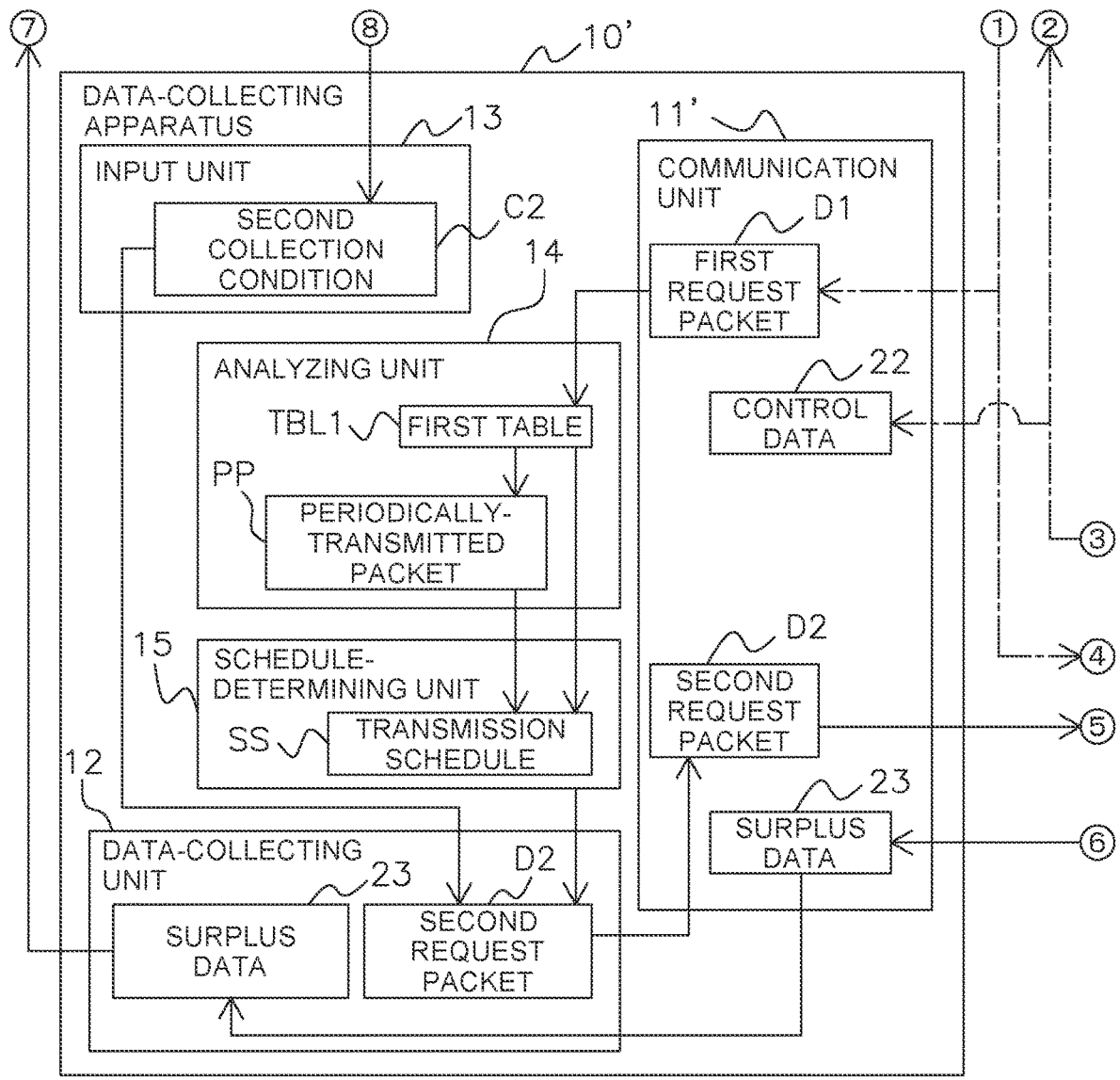
FIG. 10 is a functional block diagram of the data-collecting apparatus according to the second embodiment.

FIG. 8 is an overall configuration diagram of an air-conditioning system 100' according to the present embodiment. FIG. 9 is a diagram showing a communication network around a data-collecting apparatus 10' according to the present embodiment. FIG. 10 is a functional block diagram of the data-collecting apparatus 10' according to the present embodiment. FIG. 10 and FIG. 4B are connected by circled numbers.

As shown in FIGS. 1 and 2, the data-collecting apparatus 10 of the first embodiment is installed to relay the communication between the management apparatus 20 and the chiller units 30a to 30c. Therefore, as shown in FIGS. 4A and 4B, the communication unit 11 of the data-collecting apparatus 10 includes the first communication unit 11a that communicates with the management apparatus 20, and the second communication unit 11b that communicates with the chiller units 30a to 30c.

For the data-collecting apparatus 10' of the present embodiment, as shown in FIGS. 8 and 9, a network NW2b' connecting a management apparatus 20 and chiller units 30a to 30c (facility equipment 30) is a bus-type network. The data-collecting apparatus 10' is installed in such a manner that the data-collecting apparatus 10' is connected to the network NW2b'. Therefore, as shown in FIG. 10, the data-collecting apparatus 10' includes one communication unit 11' connected to the network NW2b'. The communication unit 11' receives first request packets D1 from the management apparatus 20, but, unlike the second communication unit 11b, does not transmit the first request packets D1 to the chiller units 30a to 30c. Further, the communication unit 11' receives control data 22 from the chiller units 30a to 30c, but, unlike the first communication unit 11a, does not transmit the control data 22 to the management apparatus 20.

Further, since the data-collecting apparatus 10' does not relay the communication between the management apparatus 20 and the chiller units 30a to 30c, the data-collecting apparatus 10' does not have, unlike the data-collecting apparatus 10, a function for responding to the management apparatus 20 on behalf of the chiller units 30a to 30c (function of the modification 1F of the first embodiment).

Hereinafter, points different from the first embodiment will be mainly described. Except for the described points, the second embodiment is similar to the first embodiment unless otherwise described.

(2) Overall Configuration

As shown in FIGS. 8 and 9, the data-collecting apparatus 10', the management apparatus 20, and the chiller units 30a to 30c are communicably connected to each other through the network NW2b'. The network NW2b' is a bus-type network. The network NW2b' is, for example, Modbus, BACnet, Ethernet, and the like. Data is transmitted and received between the data-collecting apparatus 10', the management apparatus 20, and the chiller units 30a to 30c through the network NW2b'.

(3) Detailed Configuration of Data-Collecting Apparatus

As shown in FIG. 10, the data-collecting apparatus 10' mainly includes the communication unit 11' and a data-collecting unit 12.

The data-collecting apparatus 10' includes a control arithmetic device and a storage device. As the control arithmetic device, a processor, such as a CPU or a GPU, can be used. The control arithmetic device reads programs stored in the storage device, and performs predetermined image processing and arithmetic processing according to the programs. In addition, according to the programs, the control arithmetic device can write an arithmetic result into the storage device, and can read information stored in the storage device. The data-collecting apparatus 10' also includes a timer. The communication unit 11', the data-collecting unit 12, an input unit 13, an analyzing unit 14, and a transmission-schedule-determining unit 15 are various functional blocks implemented by the control arithmetic device and the storage device.

(3-1) Communication Unit

The communication unit 11' connects the data-collecting apparatus 10' to the network NW2b' that connects the management apparatus 20 and the chiller units 30a to 30c.

(3-2) Data-Collecting Unit

As shown in FIG. 10, the data-collecting unit 12 collects, with the communication unit 11', surplus data 23 from the chiller units 30a to 30c on the basis of a second collection condition C2, which is different from a first collection condition at a time when the management apparatus 20 collects control data 22 from the chiller units 30a to 30c.

(3-3) Analyzing Unit

As shown in FIG. 10, the analyzing unit 14 creates a first table TBL1 in which first request packet information, and the receipt times of the first request packets D1 are accumulated. Every time the communication unit 11' receives a first request packet D1, the analyzing unit 14 acquires, from the communication unit 11', the first request packet information and receipt time of the first request packet D1, and updates the first table TBL1. The "receipt time" of the first table TBL1 is a time at which the communication unit 11' receives the first request packet D1.

(3-4) Transmission-Schedule-Determining Unit

When the analyzing unit 14 determines periodically-transmitted packets PP, the transmission-schedule-determining unit 15 calculates, on the basis of the receipt times of the periodically-transmitted packets PP received by the communication unit 11', a receipt time period of consecutive ones of the periodically-transmitted packets PP and an interval time period during which the periodically-transmitted packets PP are not transmitted, to determine a transmission schedule SS of second request packets D2.

Among the consecutive ones of the periodically-transmitted packets PP, the data-collecting unit 12 acquires, from the communication unit 11' or the analyzing unit 14, the timing at which the last periodically-transmitted packet PP is received.

(4) Features (4-1)

In the data-collecting apparatus 10' of the present embodiment, the communication unit 11' connects the data-collecting apparatus 10' to the network NW2b' that connects the management apparatus 20 that manages the chiller units 30a to 30c, and the chiller units 30a to 30c. The data-collecting unit 12 collects, with the communication unit 11', surplus data 23 from the chiller units 30a to 30c on the basis of the second collection condition C2, which is different from the first collection condition at a time when the management apparatus 20 collects control data 22 from the chiller units 30a to 30c.

As a result, the data-collecting apparatus 10' can collect, from the chiller units 30a to 30c, the useful surplus data 23 except the control data 22 collected by the management apparatus 20 from the chiller units 30a to 30c.

(4-2)

For the data-collecting apparatus 10' of the present embodiment, the network NW2b' connecting the management apparatus 20 and the chiller units 30a to 30c is a bus-type network.

As a result, the data-collecting apparatus 10' is connected to the bus-type network, and thus can collect surplus data 23 on the basis of the second collection condition C2 without a change to an existing system.

(4-3)

In the data-collecting apparatus 10' of the present embodiment, the transmission-schedule-determining unit 15 determines a transmission schedule SS of second request packets D2. The second request packets D2 are communication packets that are for requesting surplus data 23 and are transmitted to the chiller units 30a to 30c when the data-collecting unit 12 collects the surplus data 23 on the basis of the second collection condition C2. The transmission-schedule-determining unit 15 determines a transmission schedule SS to transmit second request packets D2 in such a manner that the timings at which first request packets D1 are transmitted are avoided.

Specifically, the transmission-schedule-determining unit 15 calculates, on the basis of the receipt times of periodically-transmitted packets PP received by the communication unit 11', a receipt time period of consecutive ones of the periodically-transmitted packets PP and an interval time period during which the periodically-transmitted packets PP are not transmitted, to determine a transmission schedule SS of second request packets D2.

As a result, according to the transmission schedule SS, the data-collecting apparatus 10' transmits the second request packets D2, so that delays in responses to periodically-transmitted packets PP can be prevented.

(5) Modifications (5-1) Modification 1A

In the present embodiment, control data 22 that satisfies the first collection condition is transmitted from the management apparatus 20 to a data-utilizing apparatus 70.

However, control data 22 that satisfies the first collection condition may be transmitted from the data-collecting apparatus 10 to the data-utilizing apparatus 70.

In other words, on the basis of the first collection condition, the data-collecting unit 12 further collects, with the communication unit 11', control data 22 from the chiller units 30a to 30c. The data-collecting unit 12 further transmits, to the data-utilizing apparatus 70, the control data 22 collected on the basis of the first collection condition.

For example, the data-collecting unit 12 collects, from the communication unit 11', control data 22 that satisfies the first collection condition and has been received from the chiller units 30a to 30c by the communication unit 11', and transmits the control data 22 to the data-utilizing apparatus 70. The data-collecting unit 12 sequentially or periodically collects control data 22 that satisfies the first collection condition, and transmits the control data 22 to the data-utilizing apparatus 70.

As a result, the data-collecting apparatus 10' can utilize, for remote monitoring, failure diagnosis, and the like, the control data 22 collected on the basis of the first collection condition. Further, the data-collecting apparatus 10' can remove a load of the management apparatus 20 transmitting control data 22 to the data-utilizing apparatus 70.

(5-2) Modification 1B

In the present embodiment, when the analyzing unit 14 determines periodically-transmitted packets PP, the transmission-schedule-determining unit 15 calculates, on the basis of the receipt times of the periodically-transmitted packets PP received by the communication unit 11', a receipt time period of consecutive ones of the periodic ally-transmitted packets PP and an interval time period during which the periodically-transmitted packets PP are not transmitted, to determine a transmission schedule SS of second request packets D2.

However, when the analyzing unit 14 determines periodically-transmitted packets PP, the transmission-schedule-determining unit 15 may calculate, on the basis of the receipt times of the periodically-transmitted packets PP received by the communication unit 11' and the receipt times of control data 22 also received by the communication unit 11' and transmitted from the chiller units 30a to 30c in response to the periodically-transmitted packets PP, response time periods of the periodically-transmitted packets PP and an interval time period during which the periodically-transmitted packets PP are not transmitted, to determine a transmission schedule SS of second request packets D2.

As a result, according to the transmission schedule SS, the data-collecting apparatus 10 transmits the second request packets D2, so that delays in responses to periodically-transmitted packets PP can be prevented.

The present modification is the modification example 1C of the first embodiment in which "the transmission times of the periodically-transmitted packets PP transmitted by the second communication unit 11b" is replaced with "the receipt times of the periodically-transmitted packets PP received by the communication unit 11", and "the receipt times of control data 22 received by the second communication unit 11b and transmitted from the chiller units 30a to 30c in response to the periodically-transmitted packets PP" is replaced with "the receipt times of control data 22 received by the communication unit 11' and transmitted from the chiller units 30a to 30c in response to the periodically-transmitted packets PP". Note that when the data-collecting unit 12 transmits second request packets D2 according to a transmission schedule SS, the data-collecting unit 12 acquires, from the communication unit 11' or the analyzing unit 14, a response time at which each control data 22 corresponding to a periodically-transmitted packet PP is received.

(5-3)

Although the embodiments of the present disclosure have been described above, it will be understood that various changes in the forms and details can be made without departing from the spirit and scope of the present disclosure as set forth in the claims.

The invention claimed is:

1. A data-collecting apparatus configured to use a processor and a storage device to collect, from at least one piece of facility equipment, operation data of the facility equipment, the data-collecting apparatus comprising:
    a communication unit connected to a network, the network connecting
        a management apparatus that manages the facility equipment, and
        the facility equipment;
    a data-collecting unit configured to collect, with the communication unit, the operation data from the facility equipment based on a second collection condition different from a first collection condition at a time when the management apparatus collects the operation data from the facility equipment; and
    an analyzing unit configured to analyze regularity of first request packets, the first request packets being communication packets, and the communication packets being
        usable to request the operation data and
        transmitted to the facility equipment when the management apparatus collects the operation data based on the first collection condition,
    the operation data of the facility equipment including control data and surplus data, the first collection condition being a condition under which part or all of control data is extracted, and the second collection condition being a condition under which part or all of surplus data is extracted.

2. The data-collecting apparatus according to claim 1, wherein
    the communication unit includes
        a first communication unit that communicates with the management apparatus, and
        a second communication unit that communicates with the facility equipment, and
    the first communication unit and the second communication unit relay communication between the management apparatus and the facility equipment.

3. The data-collecting apparatus according to claim 1, wherein
    the network is a bus network.

4. The data-collecting apparatus according to claim 1, wherein
    the data-collecting unit is configured to transmit the operation data collected based on the second collection condition, to a data-utilizing apparatus different from the management apparatus and utilizing the operation data.

5. A data-collecting apparatus configured to use a processor and a storage device to collect, from at least one piece of facility equipment, operation data of the facility equipment, the data-collecting apparatus comprising:
    a communication unit connected to a network, the network connecting
        a management apparatus that manages the facility equipment, and
        the facility equipment; and
    a data-collecting unit configured to collect, with the communication unit, the operation data from the facility equipment based on a second collection condition different from a first collection condition at a time when the management apparatus collects the operation data from the facility equipment, the data-collecting unit being configured to transmit the operation data collected based on the second collection condition, to a data-utilizing apparatus different from the management apparatus and utilizing the operation data, and the data-collecting unit being further configured to
collect, with the communication unit, the operation data from the facility equipment based on the first collection condition, and
transmit the operation data collected based on the first collection condition to the data-utilizing apparatus.

6. The data-collecting apparatus according to claim 4, further comprising:
an input unit configured to
input the second collection condition, and
receive at least input from the data-utilizing apparatus.

7. A data-collecting apparatus configured to use a processor and a storage device to collect, from at least one piece of facility equipment, operation data of the facility equipment, the data-collecting apparatus comprising:
a communication unit connected to a network, the network connecting
a management apparatus that manages the facility equipment, and
the facility equipment;
a data-collecting unit configured to collect, with the communication unit, the operation data from the facility equipment based on a second collection condition different from a first collection condition at a time when the management apparatus collects the operation data from the facility equipment; and
an analyzing unit configured to analyze regularity of first request packets, the first request packets being communication packets, and the communication packets being
usable to request the operation data and
transmitted to the facility equipment when the management apparatus collects the operation data based on the first collection condition,
based on first request packet information that includes information on the facility equipment and request contents of the first request packets, the analyzing unit is configured to determine a periodically-transmitted packet,
the facility equipment is a transmission destination of the first request packets, and the periodically-transmitted packet is the first request packet periodically transmitted.

8. The data-collecting apparatus according to claim 7, wherein
among the first request packets transmitted within a predetermined period, the analyzing unit is configured to
total a number of the first request packets whose part of the first request packet information is the same, and
determine that the first request packet having at least the largest totaled value is the periodically-transmitted packet.

9. A data-collecting apparatus configured to use a processor and a storage device to collect, from at least one piece of facility equipment, operation data of the facility equipment, the data-collecting apparatus comprising:

a communication unit connected to a network, the network connecting
a management apparatus that manages the facility equipment, and
the facility equipment;
a data-collecting unit configured to collect, with the communication unit, the operation data from the facility equipment based on a second collection condition different from a first collection condition at a time when the management apparatus collects the operation data from the facility equipment;
an analyzing unit configured to analyze regularity of first request packets, the first request packets being communication packets, and the communication packets being
usable to request the operation data and
transmitted to the facility equipment when the management apparatus collects the operation data based on the first collection condition; and
a transmission-schedule-determining unit configured to
determine a transmission schedule of a second request packet, the second request packet being a communication packet, and the communication packet being
usable to request the operation data, and
transmitted to the facility equipment when the data-collecting unit collects the operation data on a basis of the second collection condition,
the transmission-schedule-determining unit being configured to determine the transmission schedule to transmit the second request packet such that timings at which the first request packets are transmitted are avoided.

10. The data-collecting apparatus according to claim 7, further comprising:
a transmission-schedule-determining unit configured to
determine a transmission schedule of a second request packet, the second request packet being a communication packet, and the communication packet being
usable to request the operation data, and
transmitted to the facility equipment when the data-collecting unit collects the operation data on a basis of the second collection condition,
based on receipt times of the periodically-transmitted packets received by the communication unit, the transmission-schedule-determining unit being configured to calculate
a receipt time period of consecutive ones of the periodically-transmitted packets and
an interval time period during which the periodically-transmitted packets are not transmitted,
to determine the transmission schedule of the second request packet.

11. The data-collecting apparatus according to claim 7, further comprising:
a transmission-schedule-determining unit configured to
determine a transmission schedule of a second request packet, the second request packet being a communication packet, and the communication packet being
usable to request the operation data, and
transmitted to the facility equipment when the data-collecting unit collects the operation data on a basis of the second collection condition, wherein
based on a receipt time of the operation data received by the communication unit and transmitted from the facility equipment in response to the periodically-transmitted packet, the transmission-schedule-determining unit being configured to calculate a response time period of the periodically-transmitted packet and an interval time period during which the periodically-transmitted packet is not transmitted, to determine the transmission schedule of the second request packet.

12. The data-collecting apparatus according to claim 9, wherein the transmission-schedule-determining unit is configured to determine the transmission schedule of the second request packet based on a priority of the second request packet.

13. The data-collecting apparatus according to claim 9, wherein the analyzing unit is further configured to analyze a bandwidth occupancy rate of the network, and based on the bandwidth occupancy rate, the transmission-schedule-determining unit is configured to determine the transmission schedule.

14. A data-collecting apparatus configured to use a processor and a storage device to collect, from at least one piece of facility equipment, operation data of the facility equipment, the data-collecting apparatus comprising:

a communication unit connected to a network, the network connecting a management apparatus that manages the facility equipment, and the facility equipment;

a data-collecting unit configured to collect, with the communication unit, the operation data from the facility equipment based on a second collection condition different from a first collection condition at a time when the management apparatus collects the operation data from the facility equipment;

an acquisition unit; and a learning unit, the communication unit including a first communication unit that communicates with the management apparatus, and a second communication unit that communicates with the facility equipment, the first communication unit and the second communication unit relaying communication between the management apparatus and the facility equipment, the acquisition unit being configured to acquire receipt times at which the communication unit receives first request packets, the first request packets being communication packets being usable to request the operation data and transmitted to the facility equipment when the management apparatus collects the operation data based on the first collection condition, and acquire first request packet information on the facility equipment, the facility equipment being a transmission destination of the first request packets, and request contents of the first request packets, and the learning unit being configured to generate a learned model, the learned model learning by association the receipt times and the first request packet information that have been acquired by the acquisition unit.

15. The data-collecting apparatus according to claim 14, further comprising:

a response unit configured to respond to the first request packets, before a predetermined time, the response unit being configured to use the learned model to predict the first request packet to be received at the predetermined time, and based on the predicted first request packet, the response unit being configured to acquire the operation data from the facility equipment, and in a case in which the predicted first request packet is received after the predetermined time, the response unit being configured to not relay the first request packet to the facility equipment, and the response unit being configured instead to transmit the operation data to the management apparatus instead of the facility equipment.

* * * * *